United States Patent
Kim et al.

(10) Patent No.: US 8,422,372 B2
(45) Date of Patent: Apr. 16, 2013

(54) METHOD OF CHANNEL RESOURCE ALLOCATION AND DEVICES IN WIRELESS NETWORKS

(75) Inventors: Joong Heon Kim, Seoul (KR); Beom Jin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 12/795,030

(22) Filed: Jun. 7, 2010

(65) Prior Publication Data

US 2010/0309869 A1  Dec. 9, 2010

Related U.S. Application Data

(60) Provisional application No. 61/185,208, filed on Jun. 9, 2009.

(30) Foreign Application Priority Data

Aug. 31, 2009 (KR) .................. 10-2009-0081292

(51) Int. Cl.
*G01R 31/08* (2006.01)

(52) U.S. Cl.
USPC .............. 370/235; 370/328; 455/450

(58) Field of Classification Search .......... 370/230, 370/235, 252, 254, 328, 329, 335, 338, 347, 370/463; 455/437, 450, 452.1, 452.2
See application file for complete search history.

(56) References Cited

U.S. PATENT DOCUMENTS

| | | | |
|---|---|---|---|
| 2005/0113102 A1 | 5/2005 | Kwon et al. | |
| 2005/0180385 A1* | 8/2005 | Jeong et al. | 370/350 |
| 2007/0218921 A1 | 9/2007 | Lee et al. | |
| 2008/0013519 A1* | 1/2008 | Kwon et al. | 370/345 |
| 2008/0212559 A1* | 9/2008 | Mahesh et al. | 370/345 |
| 2010/0128679 A1* | 5/2010 | Kwon | 370/329 |
| 2010/0289872 A1* | 11/2010 | Funabiki et al. | 348/43 |

FOREIGN PATENT DOCUMENTS

| | | |
|---|---|---|
| EP | 1876778 | 1/2008 |
| KR | 10-0601118 | 7/2006 |
| KR | 10-0801893 | 2/2008 |
| KR | 10-2008-0020425 | 3/2008 |
| KR | 10-0914707 | 8/2009 |
| WO | 2008/026868 | 3/2008 |

* cited by examiner

*Primary Examiner* — Jung Park
(74) *Attorney, Agent, or Firm* — Lee, Hong, Degerman, Kang & Waimey

(57) ABSTRACT

A method of allocating channel resources from a first device to a second device in a wireless network comprises receiving channel resource allocation information from a coordinator of the wireless network to allocate the channel resources; transmitting data to the second device through the allocated channel resources; receiving channel resource request information from the second device to request the first device to allocate a part of the allocated channel resources; and deciding whether to allocate the part of the channel resources allocated from the coordinator, to the second device in accordance with the channel resource request information.

12 Claims, 19 Drawing Sheets

FIG. 16

| Bits : 2 | 3 | 13 | 1 bit | 1 bit | 6 |
|---|---|---|---|---|---|
| Protocol version | Packet class | MAC control | Time Request Confirm (TRC) | Time Change Confirm (TCC) | Reserved |
| 60 | 61 | 62 | 63 | 64 | 65 |

METHOD OF CHANNEL RESOURCE ALLOCATION AND DEVICES IN WIRELESS NETWORKS

This application claims the benefit of U.S. Provisional Application No. 61/185,208, filed on Jun. 9, 2009, which is hereby incorporated by reference as if fully set forth herein, and claims the benefit of and right of priority to Korean Patent Application No. 10-2009-0081292, filed on Aug. 31, 2009, which is hereby incorporated by reference as if fully set forth herein.

BACKGROUND OF THE INVENTION

1. Field of the Invention

The present invention relates to a wireless network, and more particularly, to a method and device of allocating channel resources between devices belonging to a wireless network.

2. Discussion of the Related Art

Recently, Bluetooth and wireless personal area network (WPAN) technologies have been developed, which form a wireless network between a relatively small number of digital devices in limited places such as homes or small companies to allow audio or video data to be exchanged between the devices. The WPAN can be used for information exchange between a relatively small number of digital devices in a relatively close distance, and enables low power and low-cost communication between the digital devices. IEEE 802.15.3 (Wireless Medium Access Control (MAC) and Physical Layer (PHY) Specifications for High Rate Wireless Personal Area Networks (WPANs)) approved on Jun. 12, 2003 defines specification of a MAC layer and a physical (PHY) layer of high rate WPAN.

FIG. 1 is a brief diagram illustrating an example of a wireless private access network (WPAN). As illustrated in FIG. 1, the WVAN is a network configured between personal devices within a limited space such as home, and allows information to be exchanged between applications without seamlessness by configuring a network through direct communication between devices. Referring to FIG. 1, the WPAN includes two or more user devices 11 to 15, one of which acts as a coordinator 11. The coordinator 11 provides basic timing of the WPAN and serves to control quality of service (QoS) requirements. Examples of the user devices include computers, PDAs, notebook computers, digital TVs, camcorders, digital cameras, printers, mikes, speakers, headsets, bar-code readers, displays, and cellular phones. All digital devices can be used as the user devices.

The WPAN is not predesigned but is an ad hoc network (hereinafter, referred to as 'piconet') formed if necessary without assistance of a central infrastructure. A procedure of forming one piconet will be described in detail. The piconet starts as a random device that can be operated as a coordinator performs the function of the coordinator. All devices perform scanning before associating with the existing piconet or starting a new piconet. Scanning means that a device collects and stores information of channels and searches whether the existing piconet exists. A device that has been commanded from an upper layer to start a piconet forms a new piconet without associating with a piconet previously formed on a random channel. The device starts a piconet by selecting a channel having little interference based on data acquired during scanning and broadcasting a beacon through the selected channel. In this case, the beacon means timing allocation information, information of other devices within a piconet, and control information broadcasted by the coordinator to control and manage the piconet.

FIG. 2 is a diagram illustrating an example of a superframe used in a piconet.

Timing control in the piconet is basically performed based on superframes. Referring to FIG. 2, each superframe starts by means of the beacon transmitted from the coordinator. A contention access period (CAP) is used to allow devices to transmit commands or asynchronous data based on contention. A channel time allocation period includes a management channel time block (MCTB) and a channel time block (CTB). The MCTB is a period where control information can be transmitted between a coordinator and a device or between devices. The CTB is a period where asynchronous data or isochronous data can be transmitted between a device and a coordinator or between other devices. For each superframe, the number and location of CAPs, MCTBs, and CTBs are determined by the coordinator and transmitted to other devices within the piconet through the beacon.

When a random device within the piconet needs to transmit data to the coordinator or other device, the device requests the coordinator to allocate channel resources for data transmission, and the coordinator allocates the channel resources to the device within the range of available channel resources. If the CAP exists within the superframe and the coordinator accepts data transmission in the CAP, the device can transmit data of small capacity through the CAP without being allocated with channel resources from the coordinator.

If the number of devices within the piconet is small, since channel resources for data transmission from each device are sufficient, no problem occurs in allocation of channel resources. However, if channel resources are insufficient due to a large number of devices, or if a specific device continues to occupy channels to transmit data of large capacity such as moving pictures even though the number of devices is small, a problem may occur in that channel resources are not allocated to the other devices even though the other devices have data to be transmitted, whereby communication cannot be performed. Also, a problem may occur in that channel resources smaller than data capacity are allocated to the other devices.

In this respect, various methods for performing bidirectional communication between devices without any problem are being studied.

SUMMARY OF THE INVENTION

Accordingly, the present invention has been devised to substantially obviate one or more problems due to limitations and disadvantages of the related art.

An object of the present invention is to provide a method of efficiently allocating channel resources between devices of a wireless network.

Another object of the present invention is to allow bidirectional communication between devices to be performed without interference of a coordinator by allocating channel resources, which are allocated to a device, to other devices.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to a first aspect of the present invention, a method of allocating channel resources from a first device to a second device in a wireless network comprises receiving channel resource allocation information from a coordinator, the channel resource allocation information used for allocating the channel resources to the first device; transmitting data to the second device through the channel resources; receiving channel resource request information which is used for requesting the first device to allocate a part of the allocated channel resources; and determining whether to allocate the part of the channel resources allocated from the coordinator, to the second device in accordance with the channel resource request information. The channel resources are channel time blocks (CTB). The channel resource request information included in the HRP (High-Rate Physical layer) ACK Header.

If it is decided to reject the the channel resource allocation request, the method further comprises transmitting data to the second device through the entire part of the channel resources allocated from the coordinator. In this case, the method further comprises transmitting channel resource allocation information to reject the channel resource allocation request to the second device. The channel resource allocation information included in the MAC (Medium Access Control) Header.

On the other hand, if it is decided to accept the channel resource allocation request, the method further comprises transmitting data to the second device through a part of the channel resources; and receiving data from the second device through the other part except for the part of the channel resources. In this case, the method further comprises transmitting channel resource allocation information to accept the channel resource allocation request to the second device. The channel resource allocation information included in the MAC Header.

Also, the method further comprises receiving channel resource change request information which is used for requesting increase or decrease of the channel resources allocated to the second device.

In this case, the method further comprises deciding whether to change the range of the channel resources allocated to the second device, in accordance with the channel resource change request information. The channel resource change request information included in the HRP ACK Header. If it is decided to reject the channel resource change request, the method further comprises maintaining the range of the channel resources allocated to the second device, and transmitting channel resource change information to reject the channel resource change request to the second device.

On the other hand, if it is decided to change the range of the channel resources allocated to the second device, the method further comprises transmitting data to the second device through a part of the changed range of the channel resources in accordance with the channel resource change request information, and receives data from the second device through the other part except for the part of the changed range of the channel resources. In this case, the method further comprises transmitting channel resource change information to accept the channel resource change request to the second device. The channel resource change information included in the MAC Header.

To achieve these objects and other advantages and in accordance with the purpose of the invention, as embodied and broadly described herein, according to a second aspect of the present invention, a method of allocating channel resources from a second device to a first device in a wireless network comprises receiving data from the first device through the channel resources, the first device being allocated with channel resources from a coordinator; and transmitting channel resource request information, the channel resource request information is used for requesting the first device to allocate a part of the channel resources to the first device. The channel resource request information included in the HRP(High-Rate Physical layer) ACK Header.

If the data are received from the first device through the entire range of the channel resources allocated from the coordinator, the method further comprises transmitting ACK/NACK signal of the data to the first device. In this case, the method further comprises receiving channel resource allocation information to reject the channel resource allocation request from the first device. The channel resource allocation information included in the MAC (Medium Access Control) Header.

On the other hand, if the data are received from the first device through the first channel resource which is a part of the channel resources allocated from the coordinator, the method further comprises transmitting the data to the first device through the other part except for the first channel resource. In this case, the method further comprises receiving channel resource allocation information to accept the channel resource request from the first device. The channel resource allocation information included in the MAC Header.

Also, the method further comprises transmitting channel resource change request information to the first device to request increase or decrease of the allocated channel resources. The channel resource change request information included in the HRP ACK Header.

If the data are received from the first device through the first channel resource, the method further comprises transmitting the data to the first device through the other part except for the first channel resource. In this case, the method further comprises receiving channel resource change information to reject the channel resource change request from the first device. The channel resource change information included in the MAC Header.

On the other hand, if the data are received from the first device through the second channel resource, the method further comprises transmitting the data to the first device through the other part except for the second channel resource. In this case, the method further comprises receiving channel resource change information to accept the channel resource change request from the first device. The channel resource change information included in the MAC Header.

To achieve these objects and other advantages and in accordance with the purpose of the invention, as embodied and broadly described herein, according to a third aspect of the present invention, a device which is a first device allocated with channel resources from a coordinator in a wireless network comprises a transmitting module transmitting data to a second device through the channel resource allocated from the coordinator; a receiving module receiving channel resource allocation request information from the second device; and a channel resource control module deciding whether to allocate a part of the channel resources to the second device, in accordance with the channel resource allocation request information.

The channel resource control module, if it is decided to accept the channel resource allocation request, transmits data to the second device through the part of the channel resources, and receives data from the second device through the other part except for the part of the channel resources. In this case, the channel resource control module transmits channel resource allocation information to accept the channel resource allocation request to the second device through the transmitting module.

The receiving module receives channel resource change request information to request increase or decrease of the channel resources allocated to the second device, and the channel resource control module decides whether to change the range of the channel resources allocated to the second device.

In this case, the channel resource control module, if it is decided to reject the channel resource change request, maintains the range of the channel resources allocated to the second device. Also, the channel resource control module transmits channel resource change information to reject the channel resource change request to the second device through the transmitting module.

On the other hand, the channel resource control module, if it is decided to change the range of the channel resources allocated to the second device, transmits data to the second device through the part of the channel resources of the changed range in accordance with the channel resource change request information, and receives data from the second device through the other part except for the part of the channel resources. In this case, the channel resource control module transmits channel resource change information to accept the channel resource change request to the second device through the transmitting module.

According to the embodiments of the present invention, the following advantages can be obtained.

First of all, a first device on a wireless network allocates its channel resources to a second device, whereby the channel resources can be used efficiently between the devices.

In this case, since the device can use the allocated channel resources without scheduling or setting up channel time, the device does not request the coordinator to allocate separate channel resources, whereby bidirectional communication can be performed between the devices without interference of the coordinator.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 16 is a diagram illustrating an example of data packets including channel resource allocation request information and channel resource change request information according to another embodiment of the present invention;

DETAILED DESCRIPTION OF THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to a wireless video area network (WVAN) which is a kind of a WPAN.

Figure 1:
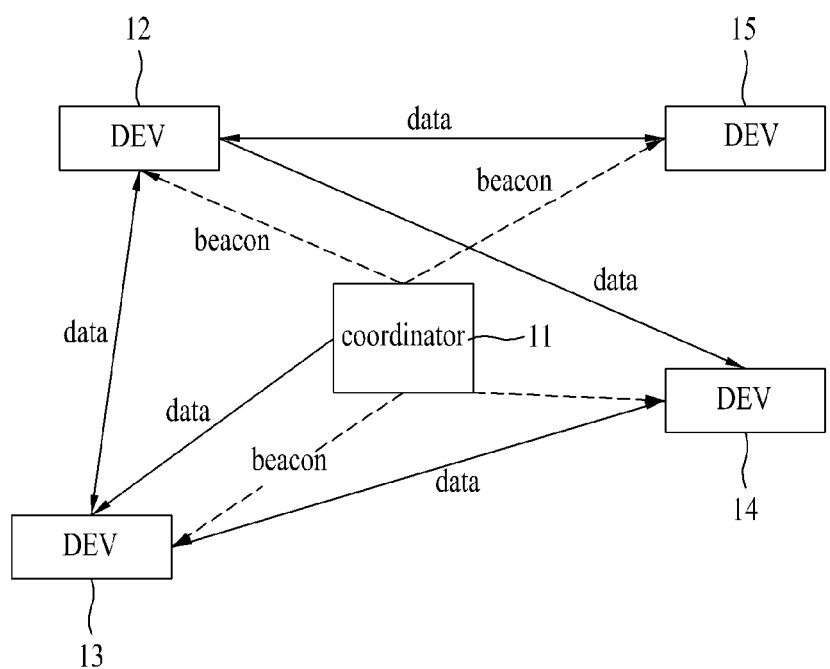
FIG. 1 is a diagram illustrating an example of a WPAN.
Figure 2:
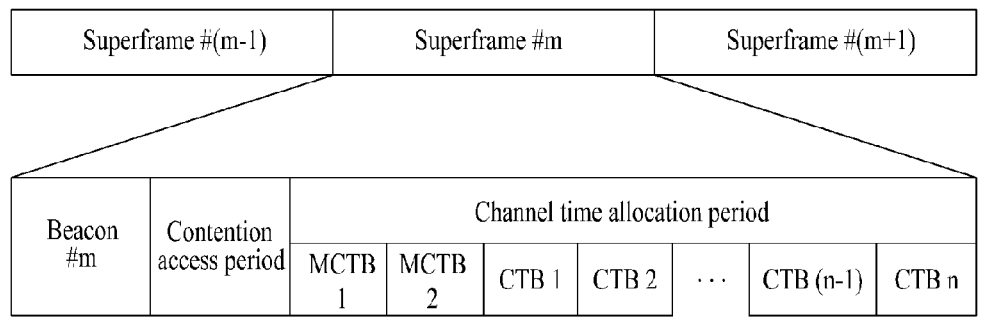
FIG. 2 is a diagram illustrating an example of a superframe used in a piconet.
Figure 3:
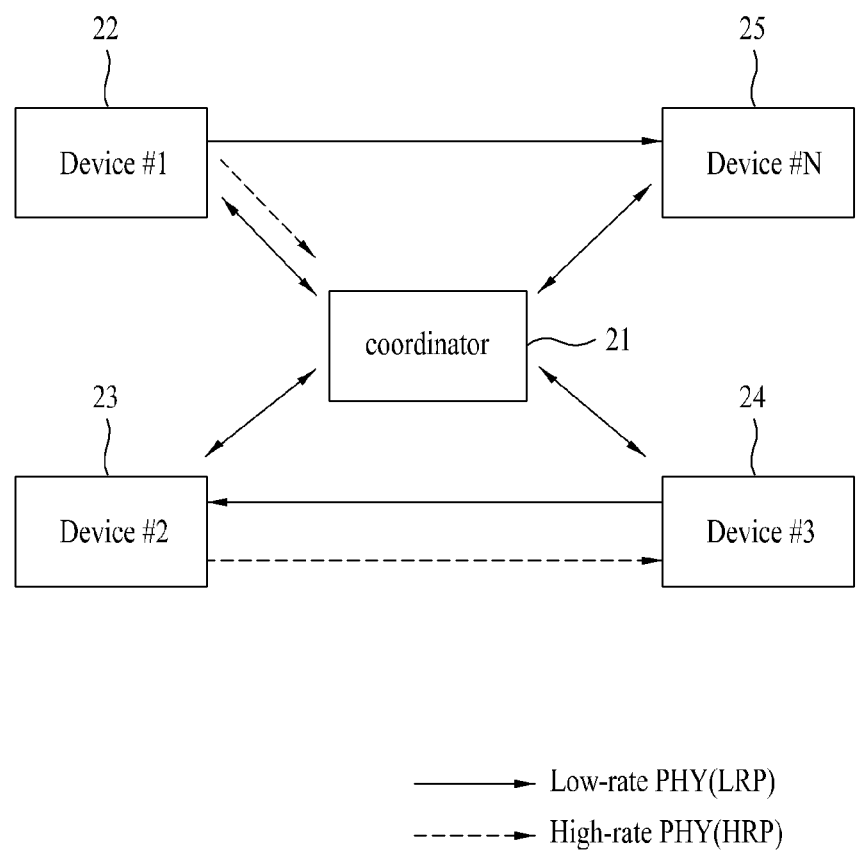
FIG. 3 is a diagram illustrating an example of a WVAN.

FIG. 3 is a brief diagram illustrating an example of a WVAN. As illustrated in FIG. 1, a WVAN includes two or more user devices 22 to 25, one of which acts as a coordinator 21. The coordinator 21 provides basic timing of the WVAN, maintains a track of devices belonging to the WVAN, and serves to control quality of service (QoS) requirements. The coordinator performs its function and at the same time serves as one device belonging to the WVAN. Other devices 22 to 25 different from the coordinator 21 can start stream connection.

One of the differences between the WVAN illustrated in FIG. 3 and the WPAN of FIG. 1 is that the WVAN of FIG. 3 supports two kinds of physical (PHY) layers. Namely, the WVAN supports physical layers, high-rate physical (HRP) layer and low-rate physical (LRP) layer. The HRP layer is a physical layer that can support a data transmission rate of 1 Gb/s or greater, and the LRP layer is a physical layer that supports a data transmission rate of several Mb/s. The HRP layer is highly directional, and is used for transmission of isochronous data streams, asynchronous data, MAC command and AN control data through unicast connection. The LRP layer supports a directional or omni-directional mode and is used for transmission of beacon, asynchronous data, MAC command through unitcast or broadcasting. The coordinator 21 can transmit or receive data to and from other device using the HRP and/or LRP layer. The other devices 22 to 25 of the WVAN can also transmit or receive data using the HRP and/or LRP layer.

Figure 4:
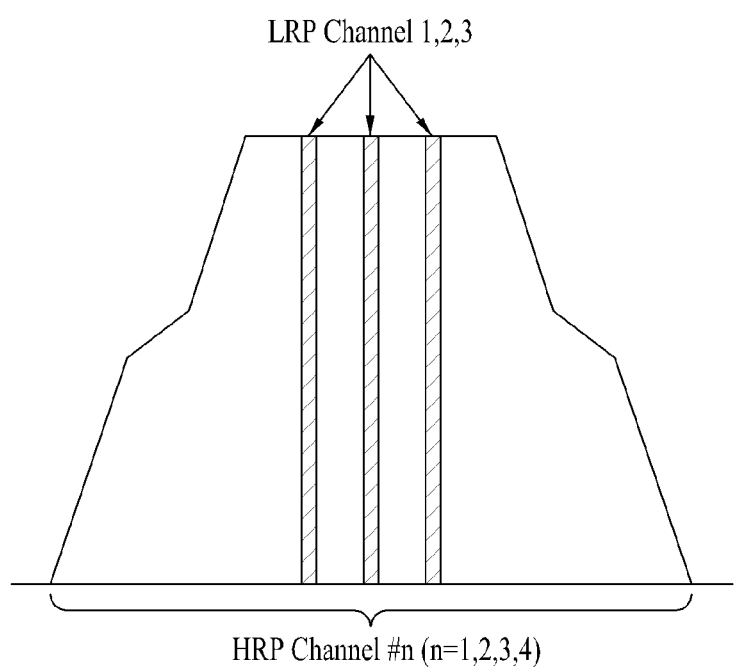
FIG. 4 is a diagram illustrating a frequency band of HRP channels and LRP channels used in a WVAN.

FIG. 4 is a diagram illustrating a frequency band of HRP channels and LRP channels used in a WVAN. The HRP layer uses four channels of a bandwidth of 2.0 GHz in a band of 57 to 66 GHz, and the LRP layer uses three channels of a bandwidth of 92 MHz. As illustrated in FIG. 4, the HRP channels and the LRP channels share a frequency band and are used respectively by a TDMA mode.

Figure 5:
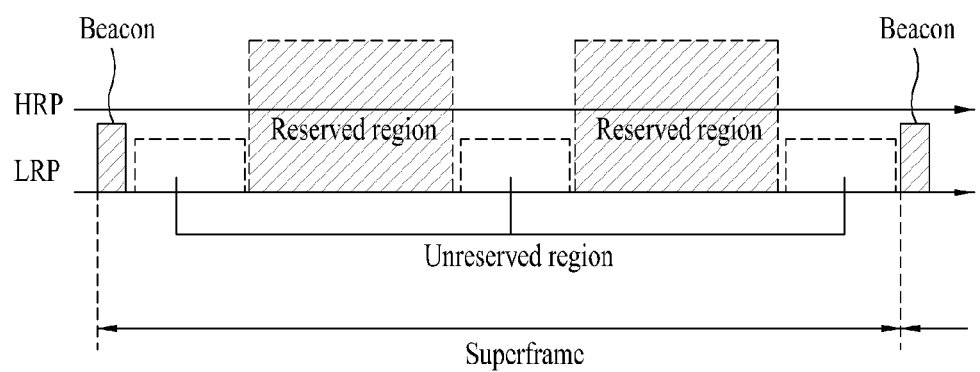
FIG. 5 is a diagram illustrating an example of a superframe used in a WVAN.

FIG. 5 is a diagram illustrating an example of a superframe used in a WVAN. Referring to FIG. 5, each superframe includes a beacon region where a beacon is transmitted, a reserved region allocated to a random device by the coordinator in accordance with a request of the devices, and an unreserved region not allocated by the coordinator but transmitting and receiving data in accordance with a contention based mode between the coordinator and device or between devices, wherein each of the regions is time divided. The beacon includes timing allocation information in a corresponding superfrmae, and management and control information of the WVAN. The reserved region is used to transmit data from a device, to which channel time is allocated by the coordinator in accordance with a channel time allocation request of the device, to other device. Command, data streams, asynchronous data, etc. can be transmitted through the reserved region. If a specific device transmits data to other device through the reserved region, the HRP channel is used. If the device that receives the data transmits ACK/NACK signal of the received data, the LRP channel is used. The unreserved region can be used to transmit control information, MAC command, or asynchronous data between the coordinator and the device or between the devices. In order to prevent data collision between the devices in the unreserved region, a carrier sense multiple access (CSMA) mode or a slotted Aloha mode can be used. If there are many kinds of control information or command to be transmitted, the reserved region can be set in the LRP channel. In each superframe, the length and the number of reserved regions and unreserved regions can be varied per superframe and are controlled by the coordinator.

Figure 6:
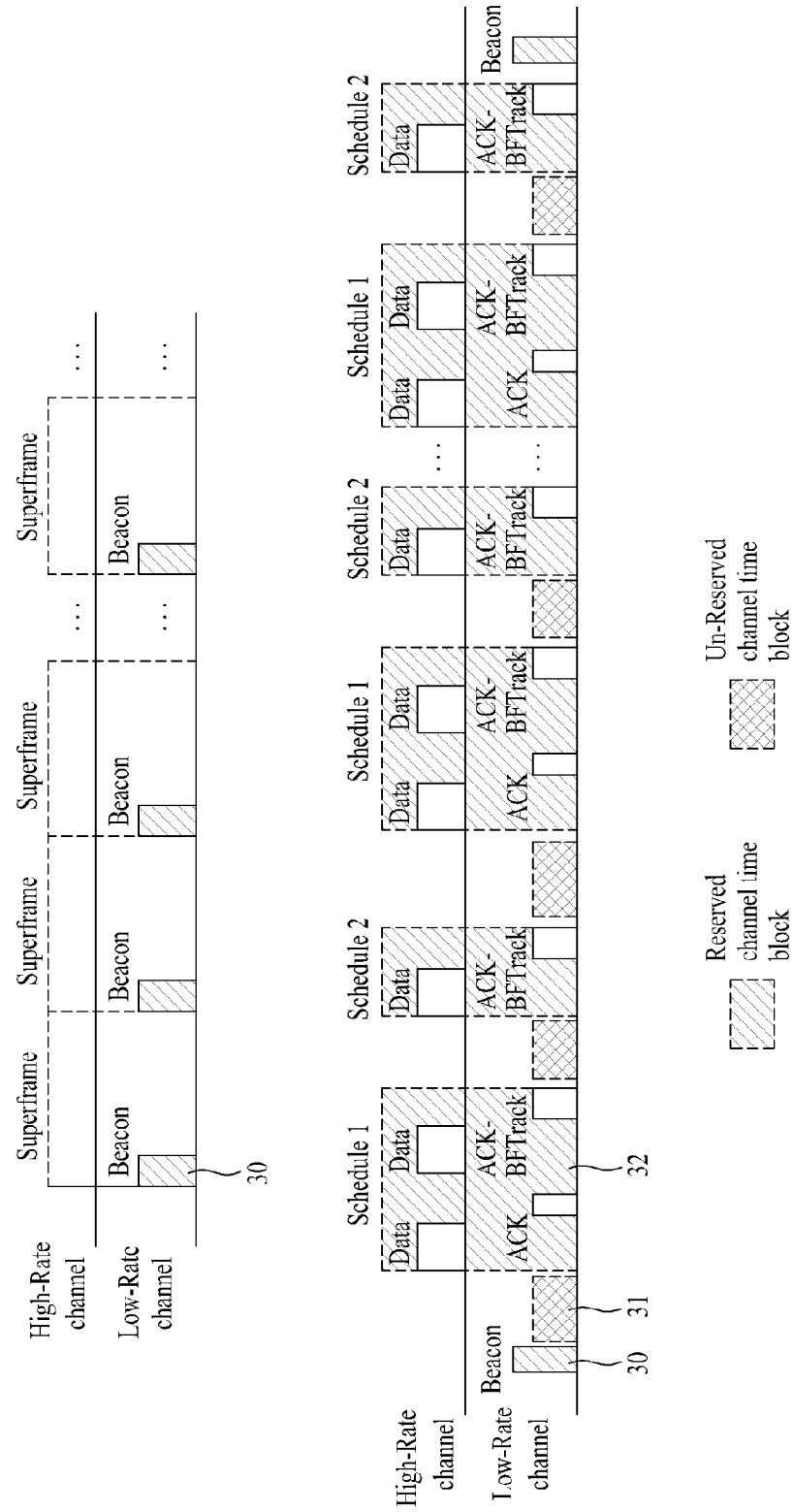
FIG. 6 is a diagram illustrating another example of a superframe used in a WVAN.

FIG. 6 is a diagram illustrating another example of a superframe used in a WVAN. Referring to FIG. 6, each superframe includes a beacon field 30 where a beacon is transmitted, a reserved channel time block 32, and an unreserved channel time block 31. Each of the channel time blocks (CTB) is time-divided into a HRP region to which data are transmitted through the HRP layer and a LRP region to which data are transmitted through the LRP layer. The beacon is periodically transmitted by the coordinator to identify a beginning part of each superframe, and includes scheduled timing information and management and control information of the WVAN. The device can exchange data in the network through the timing information and management/control information included in the beacon.

In the HRP region, the reserved CTB field can be used to transmit data from a device, to which channel time is allocated by the coordinator in accordance with a channel time allocation request of the device, to other device. If a specific device transmits data to other device through the reserved CTB field, the HRP channel is used. If the device that receives the data transmits ACK/NACK signal of the received data, the LRP channel is used.

The unreserved CTB field can be used to transmit control information, MAC command, or asynchronous data between the coordinator and the device or between the devices. In order to prevent data collision between the devices in the unreserved CTB field, a carrier sense multiple access (CSMA) mode or a slotted Aloha mode can be used. If there are many kinds of control information or command to be transmitted, the reserved region can be set in the LRP channel. In each superframe, the length and the number of reserved CTB fields and unreserved CTB fields can be varied per superframe and are controlled by the coordinator.

Furthermore, although not shown in FIG. 6, each superframe includes a contention-based control period (CBCP) located next to the beacon to transmit urgent control/management messages. The length of the CBCP is set so as not to exceed a given threshold value mMAXCBCPLen.

Figure 7:
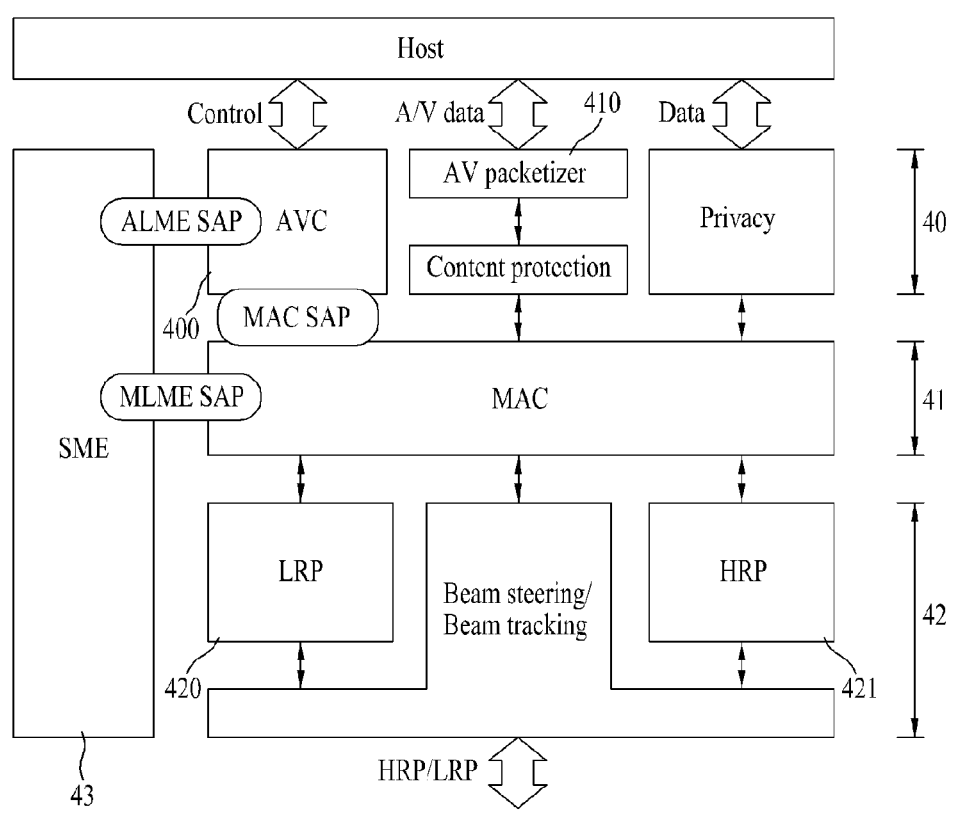
FIG. 7 is a diagram illustrating a protocol layer structure implemented in a device of a WVAN.

FIG. 7 is a diagram illustrating a protocol layer structure implemented in a device of a WVAN.

Referring to FIG. 7, a communication module of each device included in the WVAN can include four layers depending on its function. Generally, the communication module includes an adaptation sublayer 40, a MAC layer 41, a PHY layer 42, and a station management entity (SME) layer 43. In this case, a station is a device for identifying the coordinator, and the station management entity (SME) means a device management entity (DME). The station management entity (SME) is a layer independent entity that controls a lower layer and collects status information of device from each layer. The station management entity SME includes entities that manage each layer of the communication module. In this case, an entity that manages the MAC layer will be referred to as a MAC layer management entity (MLME), and an entity that manages the adaptation layer will be referred to as an adaptation layer management entity (ALME).

The adaptation sublayer 40 includes an AVC protocol 400 and an A/V packetizer 410. The AVC protocol 400 is an upper layer that performs device control and streaming connection for A/V data transmission between a transmitting device and a receiving device. The A/V packetizer 410 formats A/V data for HRP data service.

The MAC layer 41 takes the role in link setup, connection or non-connection, and channel access to a lower layer of a material transmission protocol, and also takes the role in reliable data transmission. In other words, the MAC layer 41 serves to transmit a control/data message or control a channel.

The PHY layer 42 directly processes A/V data, or the A/V data may be processed simultaneously by the PHY layer 42 and the MAC layer 31. The PHY layer is responsible for the task to convert a message requested from the upper layers such as the adaptation layer 30 and the MAC layer 41, so that the message can be sent and received between devices by the PHY layer. Also, the PHY Layer includes the aforementioned two kinds of physical layers, HRP layer 420 and LRP layer 421.

The layers of the device provide services such as a high rate service, a low rate service, and a management service. The high rate service is used for video, audio and data transfer, and the low rate service is used for transmission of audio data, MAC command, and asynchronous data of small capacity. The respective layers transmit and receive a simple message to and from each other before a process of data exchange is performed between the respective layers. The message exchanged between such different layers is referred to as primitive.

In order to perform wireless communication between devices in the wireless network, a random device should be allocated with channel resources from the coordinator. If a channel allocation request for transmitting A/V data from a random device to other device is received, the coordinator performs a channel search process for searching a channel having minimum interference. If channel resources are available, the coordinator allocates the channel resources to the device that requests channel allocation, and the device to which channel resources are allocated from the coordinator can transmit data to other device of the wireless network using the allocated channel resources.

Figure 8:
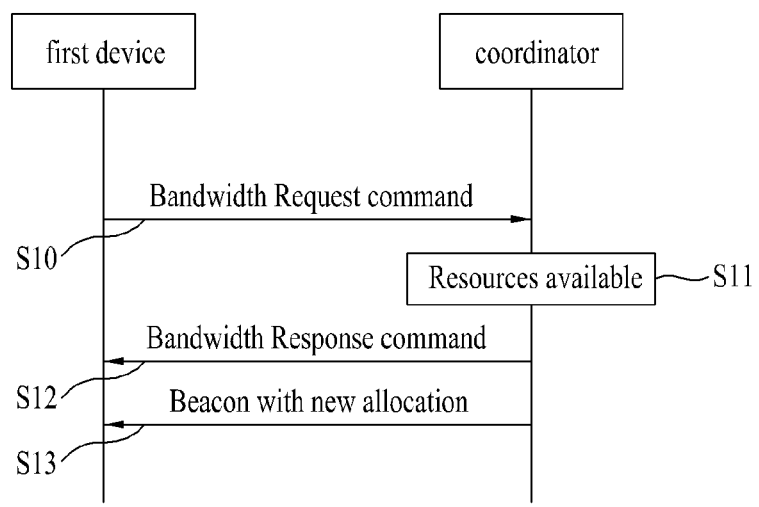
FIG. 8 is a flow chart illustrating an example of a procedure of allocating channel resources from a coordinator to a random device in a wireless network.

FIG. 8 is a flow chart illustrating an example of a procedure of allocating channel resources from a coordinator to a random device in a wireless network.

Referring to FIG. 8, the device transmits a channel resource request message (bandwidth request command) to the coordinator so that a channel resource for data transmission is allocated thereto (S10). The coordinator which has received the channel resource request message searches whether there are available channel resources to be allocated to the device (S11). As a result, if there are available channel resources, the coordinator transmits a response message (bandwidth response command) to the device, wherein the response message indicates allocation of the requested channel resources (S12). The coordinator transmits information of type or range of the channel resources, which are to be newly allocated, to the device through a beacon (S13). At this time, other devices belonging to the WVAN receive information, which indicates allocation of channel resources from the coordinator to the device, through the beacon broadcasted from the coordinator.

When the device requests the coordinator to allocate channel resources, the device can request allocation of channel resources by specifying an allocated schedule type in a channel resource request message. The schedule type can be divided into a static schedule type and a dynamic schedule type depending on attributes of a channel time block (CTB) included in a superframe. The static schedule type means that same sized superframes including at least one CTB are continuously allocated for data transmission like A/V data that should be transmitted continuously for a certain time. In this case, the same number of CTBs are included in each superframe. On the other hand, the dynamic schedule type is for temporary transmission of data such as beam search and control message change. Since the respective superframes may not have the same size, there is no limitation in the number of CTBs included in each superframe.

In FIG. 8, the channel resource request command (bandwidth request command) is to allow the device to request the coordinator to allocate, change or terminate channel resources, thereby performing a procedure related to data transmission to the coordinator or other device. A channel resource request command packet includes a field indicating n number of bandwidth request items, wherein one of the n number of bandwidth request items includes a data format as illustrated in Table 1.

TABLE 1

| Octets: 1 | 1 | 1 | 1 | 1 | 2 | 2 | 2 | 1 |
|---|---|---|---|---|---|---|---|---|
| Trgt ID | Stream request ID | Stream Index | Minimum number of time blocks | Maximum number of time blocks | Time Block Duration | Minimum schedule period | Maximum schedule period | Request Control |

Referring to Table 1, the channel resource request item field includes a TargID field indicating ID of a device requesting allocation of channel resources, a Stream request ID field indicating a type of a request message of a device, a Stream Index field indicating stream index allocated by the coordinator, a field indicating a minimum number of time blocks of channel resources included in one superframe, a field indicating a maximum number of time blocks of channel resources, a time block duration field indicating a duration of each channel resource, a minimum schedule period field indicating a minimum schedule period, a maximum schedule period field indicating a maximum schedule period, and a request control field including request information of channel resources.

The stream index field indicates the stream index assigned by the coordinator. The coordinator allocates a unique stream index for each stream of the WVAN depending on data or traffic type to be transmitted from the device. For example, if the device requests isochronous streams, the stream index field is set to an unassigned stream index. In the case where the device is requesting the reservation or termination of channel resources for asynchronous streams, the stream index field is set to a value for transmitting asynchronous streams.

The field indicating a minimum number of time blocks of channel resources represents the minimum number of requested channel resources (for example, channel time blocks) in one superframe if the device requests channel resources to transmit isochronous data while it represents a total number of channel resources included in one super frame if the device requests channel resources to transmit asynchronous data. The field indicating a maximum number of time blocks of channel resources represents the maximum number of channel resources requested from the device if the device requests channel resources to transmit isochronous data while the field is reserved for transmission of other data if the device requests channel resources to transmit asynchronous data.

The time block duration field represents the time when a plurality of channel resource blocks included in a schedule are continued within the schedule.

The minimum schedule period field represents a minimum value of a period from the time when the first channel resource block starts to the time when the second channel resource block starts, when the two channel resource blocks are allocated continuously.

The maximum schedule period field represents a maximum value of a period from the time when the first channel resource block starts to the time when the second channel resource block starts, when the two channel resource blocks are allocated continuously. On the other hand, if the device requests channel resources for asynchronous data, the maximum schedule period field represents the time when the first channel resource block allocated within a superframe starts.

The request control field designates a schedule type of the channel resources allocated by the coordinator and a type of a physical layer. For example, if 1 bit is allocated to indicate the schedule type, the static schedule type is set to 1 and the dynamic schedule type is set to 0.

As described above, the device can request the coordinator to allocate channel resources through the channel resource request command by designating type, time, etc. of the channel resources.

The coordinator which has received the channel resource request command can transmit a channel resource response command (bandwidth response command) to the device after searching whether there are available channels to be allocated to the device. The channel resource response command includes n number of channel response items (bandwidth response items) corresponding to the response to n number of channel resource request items included in the channel resource request command. In this case, the channel resource response item field can include a data format as illustrated in Table 2.

TABLE 2

| Octets: 1 | 1 | 1 |
|---|---|---|
| Stream Request ID | Stream Index | Reason Code |

Referring to Table 2, an example of the channel resource response item field represents stream request ID and stream index as designated by the channel resource request command received from the device. The channel resource response item field includes a stream request ID field, a stream index field, and a resource code field. The reason code field designates a code indicating whether the coordinator can allocate channel resources depending on a request of the device and indicating a reason why that the coordinator cannot allocate channel resources. For example, the reason code field can designate 0x00 code indicating that channel resource allocation can be performed if there are available channel resources as a result of channel resource search of the coordinator, or can transmit 0x02 code indicating an impossible reason of channel resource allocation if allocation of channel resources cannot be performed due to handover when the device requests additional channel resources.

When allocating channel resources of a certain range to the device, the coordinator transmits allocation information of new channel resources to the device through a beacon.

Generally, the beacon is transmitted through an omni-directional low-rate physical data unit (LRPDU) in a non-encoded state, and includes scheduled timing information and management and control information of the WVAN. A beacon data packet includes a MAC control header, a beacon control field, and a schedule information element (IE) field indicating n number of schedule information. Generally, an IE data format includes IE index, IE signal length, and a field containing information to be transferred.

The schedule IE represents timing information of a schedule in next superframe. For example, the schedule IE included in the Nth beacon represents timing information of a superframe that starts from the N+1th beacon. The schedule IE includes n number of schedule blocks, each of which includes index information of stream to which the schedule is allocated, a schedule period, the number of channel time blocks allocated to one schedule, timing information that the first channel time block of the schedule starts, and duration information that each channel time block is maintained.

The beacon control field includes a beacon status field, a superframe timing information specifying timing information of an transmission interval between continued beacons, and a field indicating the number of superframes. A data packet of the beacon status field included in the beacon control field is configured as illustrated in Table 3.

TABLE 3

| Bits: 1 | 1 | 1 | 1 | 1 | 3 |
|---|---|---|---|---|---|
| Free channel time | Configuration change | Schedule change | Static schedule | Accepting commands | Reserved |

Referring to Table 3, an example of the beacon status information includes a free channel time field indicating information of the presence of available channel resources depending on a channel resource request, a configuration change field indicating whether configuration of channel resources specified in a current beacon has been changed, except for a field indicating the number of superframes, a schedule change field indicating whether channel resource scheduling on the current superframe has been changed as compared with a previous beacon, a static schedule field indicating whether static schedule IE has been include din the current beacon, an accepting commands field indicating whether to accept channel resource allocation request, and a reserved field to which other data can be transmitted.

In Table 3, the free channel time field can be set to 1 if the coordinator allocates channel resources while the free channel time field can be set to 0 if the coordinator decides not to allocate channel resources. The configuration change field can be set to 0 if there is no change. Although the static schedule field may not need to be included in all beacons to reduce overhead occurring due to beacon, the static schedule IE can periodically be included in the beacon. Likewise, if there is no static schedule IE included in the beacon, the static schedule field can be set to 0. The accepting commands field can also be set to 0 if the coordinator rejects channel allocation request of the device.

The device to which the channel resources are allocated through the aforementioned procedure forms a WVAN with other device, and can transmit data through the allocated channel resources.

One embodiment of the present invention relates to a method of allocating channel resources to allow a device to which channel resources are allocated through the aforementioned procedure to perform bi-directional communication with other device. Hereinafter, the method of allocating channel resources will be described with reference to FIG. 9.

Figure 9:
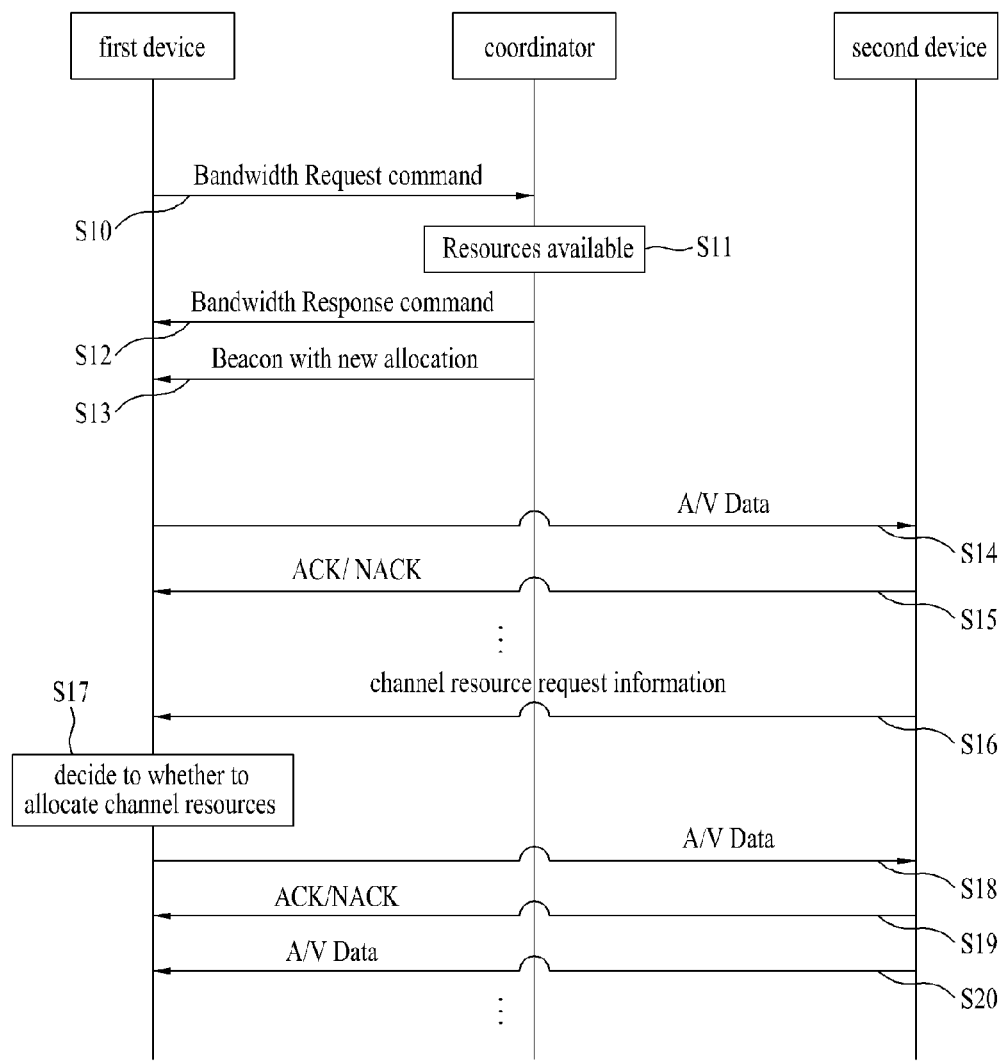
FIG. 9 is a flow chart illustrating an example of a procedure of allocating channel resources between devices of a wireless network in accordance with one embodiment of the present invention.

FIG. 9 is a flow chart illustrating an example of a procedure of allocating a part of channel resources from a first device to a second device in accordance with one embodiment of the present invention.

Hereinafter, for convenience of description, a device that transmits data to other device through channel resources allocated from a coordinator in a wireless network will be referred to as a first device, and a device that receives data from the first device will be referred to as a second device.

Referring to FIG. 9, the first device is allocated with certain channel resources from the coordinator and transmits the channel resources to the second device. Steps S10 to S13 of allocating channel resources are identical with those of FIG. 8.

The first device transmits A/V data to the second device through the channel resources allocated from the coordinator (S14). The A/V data mean target data for transmission between the devices, and include at least one of audio data and video data. However, the data transmitted from the first device to the second device are not limited to the A/V data. The second device that receives data from the first device transmits ACK/NACK signal of the received data to the first device (S15).

The ACK signal means an acknowledgement signal transmitted from the receiving device to the transmitting device to indicate that the signal transmitted from the transmitting device has been received normally. The transmitting device can transmit next data if the ACK signal is received. On the other hand, the NACK signal means a non-acknowledgement signal transmitted from the receiving device to the transmitting device to indicate that the signal has not been received normally due to signal loss and error. The transmitting device should retransmit the data if the NACK signal is received. Namely, in FIG. 9, the ACK/NACK signals are acknowledgement signals indicating whether the data transmitted from the first device has been received normally in the second device.

The steps S14 and S15 are repeated, and then if the second device intends to transmit A/V data to the first device, the second device transmits channel resource request information to the first device to request the first device to allocate a part of the channel resources allocated from the coordinator (S16). For example, video conversation is required when a cellular phone transmits data of large capacity such as music files to a server, certain channel resources should be allocated to the server to enable data transmission of large capacity and video conversation. According to one embodiment of the present invention, the second device can request the first device not the coordinator to allocate channel resources.

The first device which has received the channel resource request information performs a procedure of deciding to allocate a part of the channel resources allocated from the coordinator to the second device (S16). In this step, if the first device decides to allocate a part of the channel resources to the second device, the first device transmits A/V data to the second device through a part of the channel resources allocated from the coordinator (S17). The second device transmits ACK/NACK signal, which indicates whether the A/V data have been normally received from the first device, to the first device (S18). The second device transmits the A/V data to the first device through the channel resources allocated from the first device (S19).

Accordingly, according to one embodiment of the present invention, if the first device allocates a part of the channel resources allocated from the coordinator, to the second device in accordance with a channel resource allocation request, bidirectional communication between the first device and the second device can be performed without allocation of channel resources from the coordinator.

Figure 10:
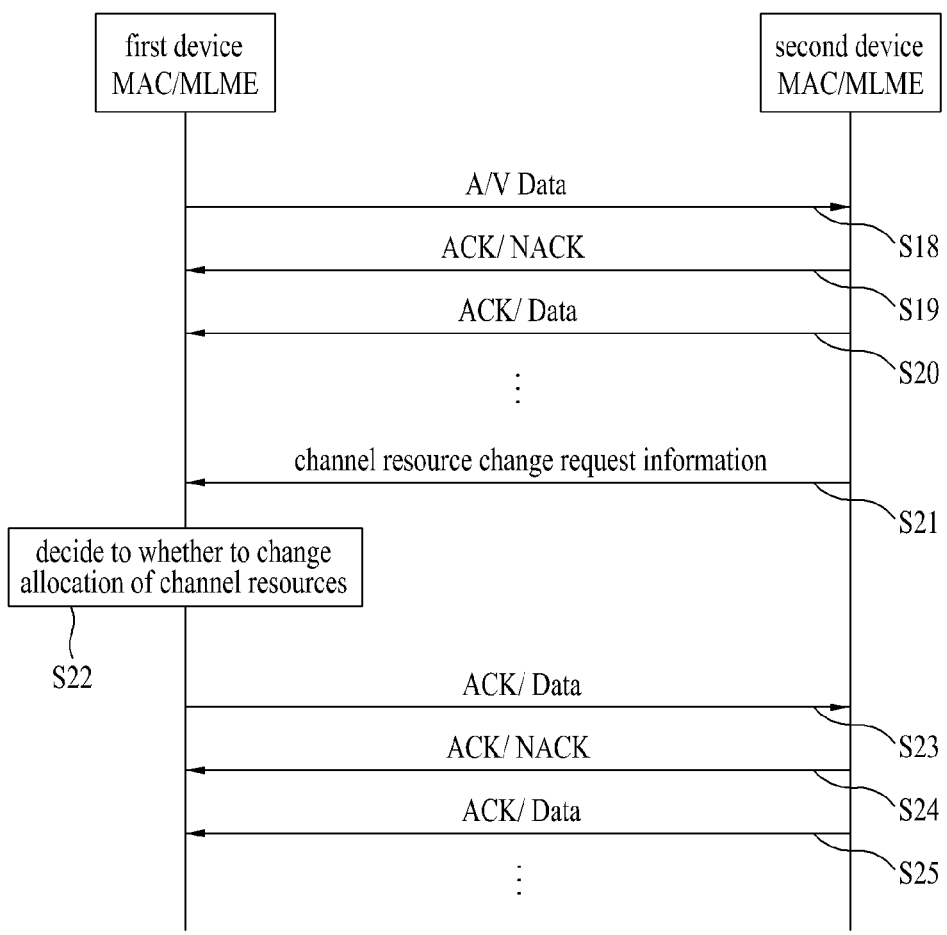
FIG. 10 is a flow chart illustrating an example of a procedure of changing a range of channel resources allocated between devices of a wireless network in accordance with one embodiment of the present invention.

FIG. 10 is a flow chart illustrating an example of a procedure of requesting a change of channel resources from a second device which is allocated with the channel resources from a first device in accordance with one embodiment of the present invention.

Referring to FIG. 10, steps S18 to S20 of transmitting data to the first device through channel resources allocated from the first device to the second device are identical with those described with reference to FIG. 9.

As described above, if the first device allocates a part of channel resources, which are allocated from the coordinator, to the second device in accordance with a request of the second device, the second device transmits channel resource change request information to the first device, wherein the channel resource change request information requests change of channel resources allocated in accordance with properties of the A/V data transmitted to the first device (S21). The channel resource change request information is to request increase or decrease of channel resources which are allocated. For example, if the second device fails to complete data transmission using only the channel resources allocated from the first device, or if continuous data transmission is required like video data, the channel resources may further be required. Accordingly, the second device can request the first device to increase the channel resources. In opposite case, the second device can request the first device to decrease the channel resources.

The first device which has received the channel resource change request information decides whether to accept the request of the second device (S22). If the first device decides to accept the request of the second device, the first device transmits A/V data to the second device through the changed channel resources in accordance with the channel resource change request information (S23). Then, the second device transmits ACK/NACK signal of the data received from the first device (S24), and also transmits data to the first device through the changed channel resources allocated from the first device (S25). For example, if the second device requests the first device to increase a bandwidth range and the first device accepts the request of the second device, the first device can allocate more channel resources to the second device by decreasing its channel resources.

Figure 11:
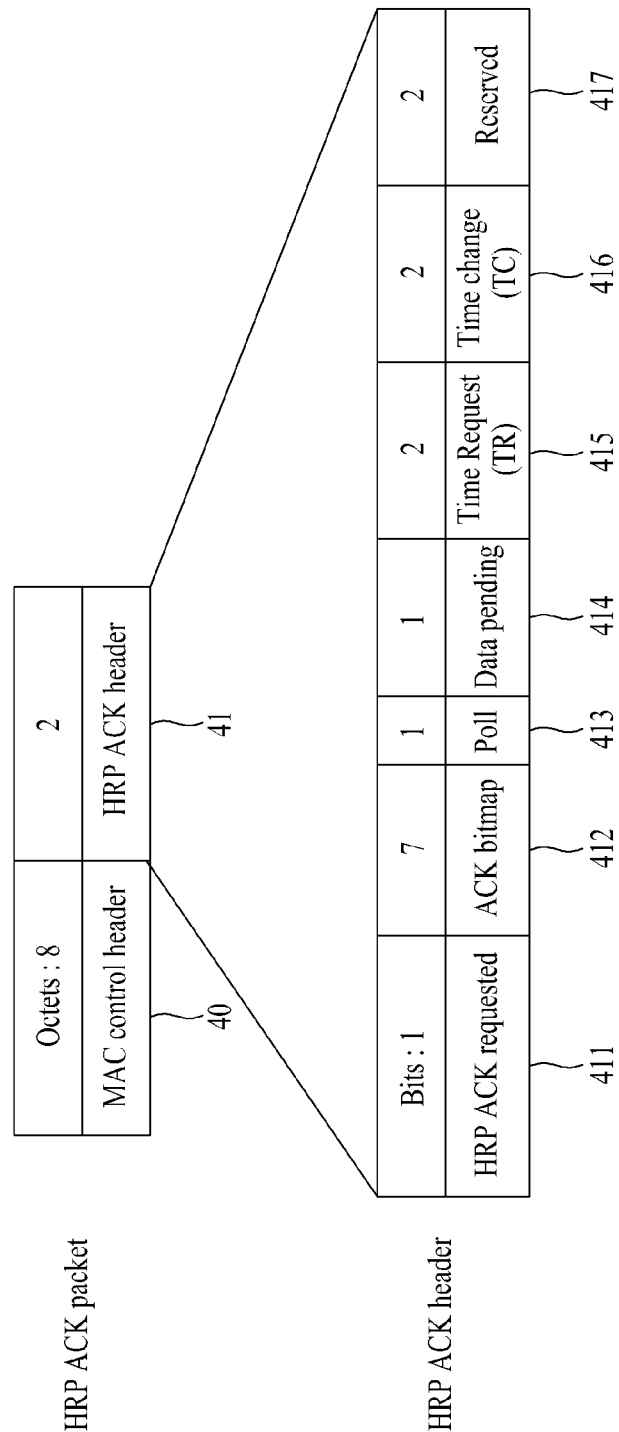
FIG. 11 is a diagram illustrating an example of data packets including channel resource allocation request information and channel resource change request information according to one embodiment of the present invention.

FIG. 11 is a diagram illustrating an example of data packets to which channel resource request information is transmitted in accordance with one embodiment of the present invention.

In the aforementioned embodiment, the channel resource request information transmitted from the second device to the first device to request allocation of the channel resources can be transmitted using the ACK/NACK signal transmitted from the second device to the first device. The channel resource request information is not transmitted through the ACK/NACK signal only but may be transmitted through oter signal.

Generally, the first device that belongs to the wireless network transmits data from the reserved field of the superframe illustrated in FIG. 5 to the second device through the HRP channel. According to one embodiment of the present invention, the second device can also transmit ACK/NACK signal, which indicates acknowledgement information of the data received from the device, through the HRP channel. If the ACK/NACK signal is transmitted through the HRP channel, the signal can be transmitted in a HRP ACK packet type as illustrated in FIG. 11. However, the ACK/NACK signal is not transmitted through the HRP channel only but may be transmitted through the LRP channel.

Referring to FIG. 11, if the second device transmits the ACK/NACK signal to the first device through the HRP channel, the HRP ACK packet includes a MAC control header field 50 and an HRP ACK header field 51. The channel resource request information according to one embodiment of the present invention can be included in the HRP ACK header field 51. The HRP ACK header field 51 includes an HRP ACK request field 511 indicating through which one of the physical channels, i.e., the HRP channel and the LRP channel the ACK/NACK signal is transmitted, an ACK bit map field 512 indicating whether the second device has normally received each of maximum seven sub packets constituting a packet body, a Poll field 513 indicating whether the second device can respond to the first device using a data packet instead of ACK packet to acknowledge reception, a data pending field 514 indicating the presence of data to be transmitted from the second device to the first device, and a reserved field 517 that can be used if data are additionally transmitted.

An example of the channel resource request information according to one embodiment of the present invention can be transmitted through a part of the reserved field. The HRP ACK header can include a time request (TR) field 515 in which information requesting allocation of channel resources is carried, and/or a time change (TC) field 516 requesting change of the allocated channel resources. Namely, a part of the reserved field 517 can newly be defined as a TR field and/or a TC field. In the case that the channel resources are allocated from the second device to the first device, the TC field 516 contains channel resource change request information for requesting increase or decrease of the allocated channel resources. Accordingly, unlike the TR field, the TC field is not always defined in a part of the HRP ACK header. In other words, the HRP ACK header can include the TR field 515 only, or can include both the TR field 515 and the TC field 516. If the TC field is not included in the HRP ACK header, the TC field can be allocated as the reserved field.

Referring to the example illustrated in FIG. 11, 2 bits can be allocated to the TR field 515 and the TC field 516, respectively. If 2 bits are respectively allocated to the TR field and the TC field, examples of a channel time request signal and a channel time change signal respectively implemented in the fields are illustrated in Table 4.

TABLE 4

| Data Format | Time Request(TR) data | Time Change(TC) data |
| --- | --- | --- |
| 00 | no time request | no time change |
| 01 | time non-constraint data | time increase |
| 10 | time constraint data | time dncrease |
| 11 | Reserved | reserved |

Referring to Table 4, if a data signal in the TR field requesting allocation channel resources is '00', the data signal 00 represents a status where channel time allocation is not requested. If the data signal is '01', it corresponds to a case where data to be transmitted from the second device are not data to be transmitted continuously and represents a channel resource request for data transmission having no time constraint. If the data signal is '10', it represents a channel resource request for data transmission dependent upon time constraint like video signal. If the data signal is '11', it represents whether the TR field is reserved.

The TC field requesting change of channel resources is significant when the first device allocates a part of the channel resources allocated from the coordinator, to the second device in accordance with a channel resource request of the second device. In other words, in a state that the first device allocates a part of the channel resources allocated from the coordinator, to the second device, if the data signal of the TC field is '00', it represents that the second device requests the first device to maintain a channel resource period allocated from the first device. If the data signal is '01', it represents that the second device requests the first device to increase the allocated channel resources. If the data signal is '10', it represents that the second device requests the first device to decrease the allocated channel resources. If the data signal is '11', it represents that the TC field is reserved, like the TR field.

The number of bits allocated to the TR field and the TC field is not limited to the aforementioned embodiment and can be obtained in various manners. According to another embodiment of the present invention, if 1 bit is allocated to the TR field and 2 bits are allocated to the TC field, the data signal in the TC field is configured as illustrated in Table 1. In case of the TR field, if the data signal is '0', it represents that allocation of channel resources is not requested. If the data signal is '1', it represents that allocation of channel resources is requested. According to still another embodiment of the present invention, as 1 bit is respectively allocated to the TR field and the TC field, if the data signal is '0', it represents that allocation of channel resources or change of channel resources is not requested. Also, if the data signal is '1', it represents that allocation of channel resources or change of channel resources is requested.

As described above, the first device which has received specific channel resource request information and/or channel resource change request information from the second device does not need to necessarily receive the request information and/or channel resource change request information. The first device can decide to accept the request of the second device based on importance of data transmitted between the first device and the second device in step S17 of deciding whether to allocate channel resources or step S22 of deciding whether to change the allocated channel resources.

For example, the first device can decide to respond to the request of the second device based on the priority order in view of data transmission in the deciding step.

The first device may request the second device to allocate a part of the channel resources. The first device can request allocation of channel resources and/or request change of the allocated channel resource using the ACK/NACK signal of the AN data received from the second device. Namely, the TR field and/or the TC field can be included in the HRP ACK header.

For example, it is assumed that the first device and the second device respectively allocate 2 bits to the TR field and the TC field and the data signal is defined as illustrated in Table 4. In this case, if the data signals in the TR fields of the first device and the second device are '01', it represents that both the first device and the second device request allocation of channel resources having no time constraint and have the same transmission order. Also, if the data signals in the TR fields of the first device and the second device are '10', it represents that both the first device and the second device request allocation of channel resources having time constraint and have the same transmission order.

Accordingly, the device that should decide whether to accept the request can randomly allocate channel resources based on the other standard. If the data signal in the TR field of the first device is '10' and the data signal in the TR field of the second device is '01', since the data to be transmitted from the first device have time constraint, the first device is prior to the second device in view of transmission. Accordingly, the first device can reject the channel resource allocation request of the second device.

On the other hand, in the case that the data signal in the TR field of the first device is '01' and the data signal in the TR field of the second device is '10', since the data to be transmitted from the second device have time constraint, the second device is prior to the first device in view of transmission. Accordingly, the first device can allocate a part of the channel resources allocated from the coordinator, to the second device by accepting the channel resource allocation request of the second device. At this time, the second device can transmit a channel resource change signal to the first device, wherein the channel resource change signal requests increase or decrease of the allocated channel resources.

Figure 12:
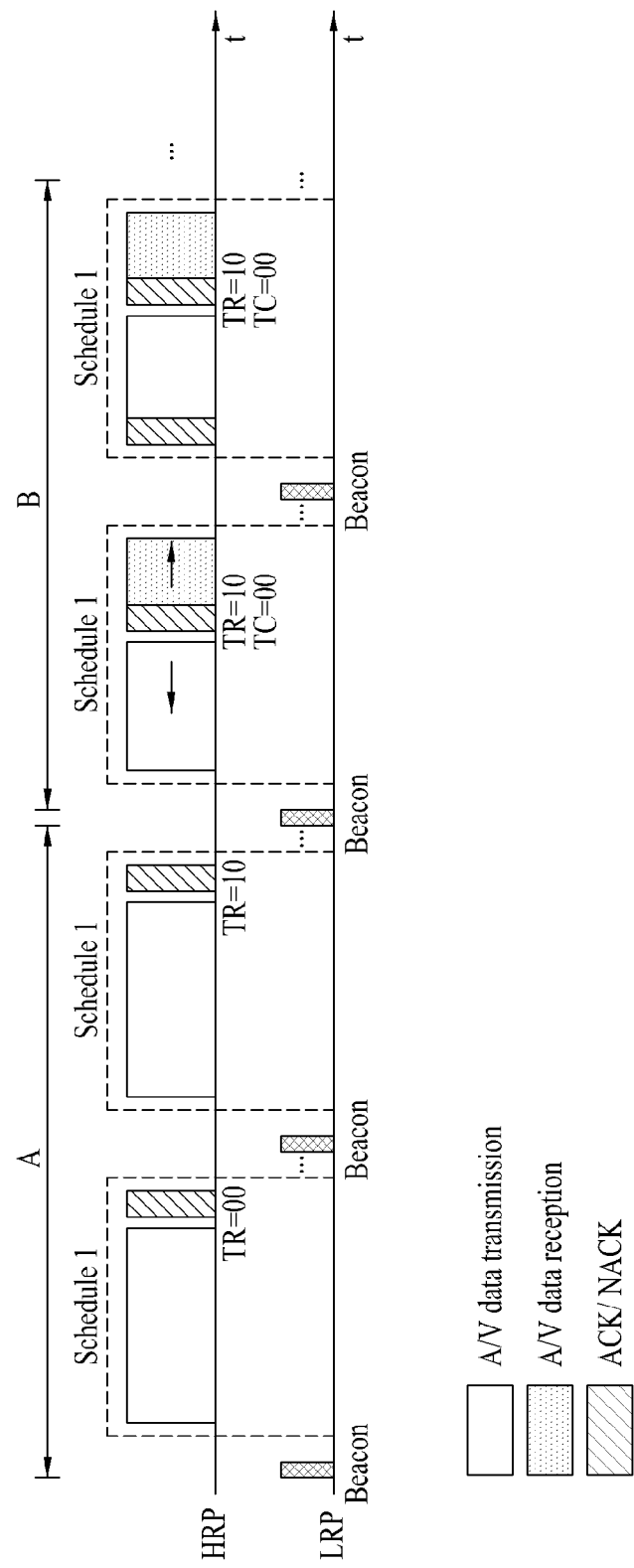
FIG. 12 is a diagram illustrating an example of data transmitted and received by channel resource allocation between devices of a wireless network in accordance with one embodiment of the present invention.
Figure 13:
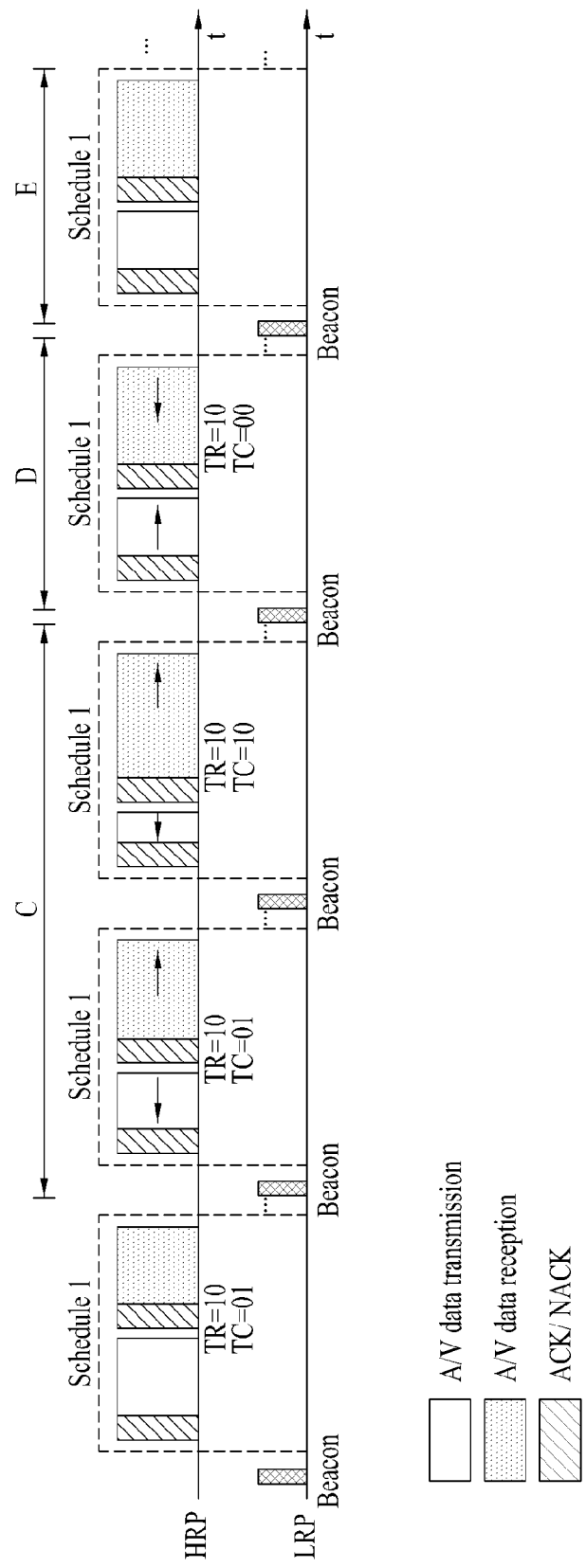
FIG. 13 is a diagram illustrating another example of data transmitted and received by channel resource allocation between devices of a wireless network in accordance with one embodiment of the present invention.

Hereinafter, FIG. 12 and FIG. 13 are intended to describe types of channel resource allocation according to the aforementioned embodiment of the present invention.

FIG. 12 is a diagram illustrating an example of channel resource allocation between devices in accordance with a channel resource request according to one embodiment of the present invention.

Referring to FIG. 12, if the first device transmits the A/V data to the second device through the HRP channel using the channel resources of a certain range, which are allocated from the coordinator, the second device transmits the ACK/NACK signal of the received A/V data to the first device using the HRP channel. An interval 'A' is that the channel resources are not requested by the second device, and a TR field data signal of the HRP ACK signal is represented by '00'. The second device that receives data transmits ACK signal having a TR field data signal of '10' like the second schedule of the interval 'A' to the first device to request channel resources. Then, the first device transmits the A/V data through a part of its all channel resources, and receives the A/V data from the second device through the other part except for the channel resources allocated to the second device and the ACK/NACK signal.

The second device which has received the channel resources transmits channel resource change request information requesting increase or decrease of the allocated channel resources, wherein the channel resource change request information is included in the TC field of the HRP ACK header. If the data signal of the TC field is '00' like a first schedule of an interval 'B', the first device can maintain a shared type of current channel resources as request information requesting to maintain channel resources allocated to the second device. In this case, the first device can request the second device to reallocate its channel resources allocated to the second device, thereto.

In FIG. 12, as described above, the beacon is a signal periodically transmitted from the first device to the second device through the LRP channel to identify the beginning part of each superframe. The second device receives information of channel resources allocated from the first device through the beacon for next schedule. For example, the first device can transfer information related to the number of CTBs included in each schedule, a start time when a CTB used to transmit data from the first device to the second device starts, a duration of a CTB used by the first device, or a duration of a CTB that can be used to transmit data from the second device to the first device, to the second device through the beacon. In the interval 'A', channel resources are not shared between the devices, and the schedules included in the interval 'A' have the same type. In the interval 'B', channel resources are shared between the devices, and the schedules included in the interval 'B' also have the same type.

Next, FIG. 13 is a diagram illustrating channel resources shared between both devices when a second device requests a first device to change the channel resources in accordance with one embodiment of the present invention.

If the channel resources are allocated from the first device to the second device, the second device can request the first device to increase or decrease the channel resources in accordance with A/V data intended to transmit.

Referring to FIG. 13, as the first device allocates a part of the channel resources allocated from the coordinator, to the second device, it transmits the A/V data to the second device through the other channel resources and receives the A/V data from the second device through the allocated channel resources. Then, the second device can request the first device to increase or decrease the allocated channel resources using the ACK/NACK signal of the A/V data received from the first device. For example, if the second device requests the first device to increase allocation of the channel resources and transmits HRP ACK signal, which includes a data signal of '01' in a TC field, to the first device and the first device accepts the request of the second device, the first device decreases the channel resources used for next A/V data transmission and allocates the other channel resources to the second device. In other words, the available range of the channel resources of the second device increases as much as decrease of the channel resources used by the first device. In FIG. 13, an interval 'C' represents that the second device transmits data through more channel resources within channel resources of a certain range in accordance with a channel resource increase request of the second device. If the second device requests the first device to decrease the channel resources, it transmits ACK/NACK signal, which includes a data signal of '10' in the TC field, to the first device. If the first device accepts the request of the second device, allocation of the channel resources is controlled, whereby an interval 'D' is implemented. If the second device intends to maintain the quantity of the current channel resources like an interval 'E', the data signal of the TC field shall be set to '00'.

As described above, according to one embodiment of the present invention, the channel resources are shared between the first device and the second device in such a manner that the first device, which has received certain channel resources from the coordinator, allocates the channel resources to the second device by implicitly deciding whether to allocate channel resources in response to the request of the second device. If the first device accepts the request of the second device, it transmits the A/V data to the second device through only a part of the channel resources allocated from the coordinator. If the first device rejects the request of the second device, it transmits the A/V data to the second device through all the allocated channel resources without transmitting a separate response message.

According to another embodiment of the present invention, in order to allocate the channel resources and change the allocated channel resources, the device which has received the request signal transmits a separate specific message to the device which has transmitted the request signal by deciding whether to accept the request.

Figure 14:
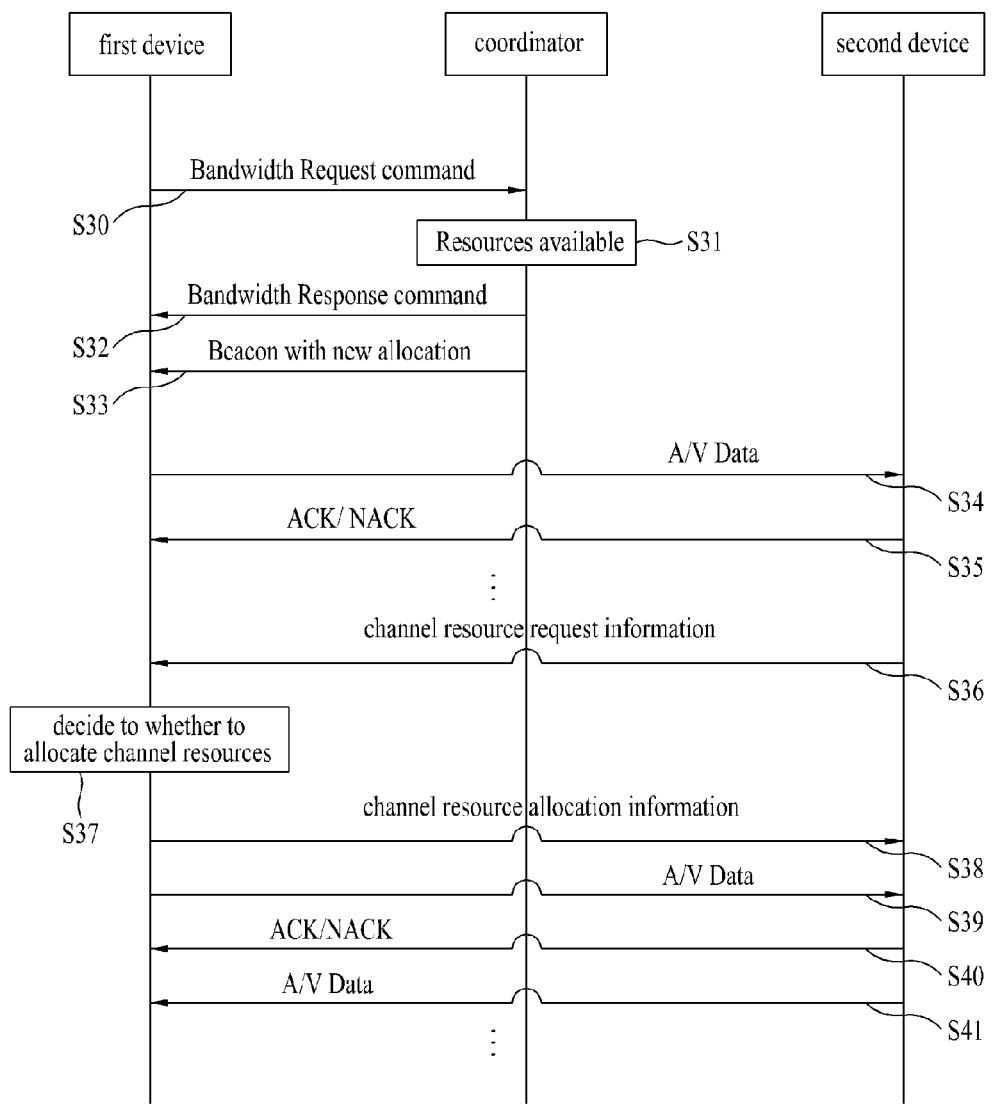
FIG. 14 is a flow chart illustrating an example of a procedure of allocating channel resources between devices of a wireless network in accordance with another embodiment of the present invention.

FIG. 14 is a flow chart illustrating an example of a procedure of allocating channel resources in accordance with another embodiment of the present invention. According to another embodiment of the present invention, the procedure of allocating channel resources includes a procedure of explicitly transmitting channel resource allocation information or channel resource change information from the first device to the second device in accordance with a channel resource allocation request of the second device.

Referring to FIG. 14, since steps S30 to S36 of transmitting data from the first device to the second device through the channel resources allocated from the coordinator and receiving the channel resource allocation request information from the second device are identical with the steps S10 to S16 of FIG. 9, their description will be omitted.

The first device which has received the channel resource request information from the second device decides whether to allocate channel resources to the second device (S37). If the first device decides to allocate channel resources to the second device, it transmits channel resource allocation information to the second device, wherein the channel resource allocation information indicates whether to allocate a part of the channel resources (S38). If the first device rejects the channel resource allocation request, it transmits channel resource allocation information rejecting the channel resource request to the second device in the step S38. Namely, unlike the channel resource allocation described with reference to FIG. 9, the first device explicitly indicates whether to allocate the channel resources to the second device. At this time, the channel resource allocation information transmitted to the second device is included in the MAC header as described below.

The first device which has decided to allocate a part of the channel resources transmits the A/V data to the second device through a part of the channel resources allocated from the coordinator (S39). The second device transmits the ACK/NACK signal of the A/V data received from the first device, to the first device (S40), and transmits the A/V data to the first device through the channel resources allocated from the first device (S41).

Figure 15:
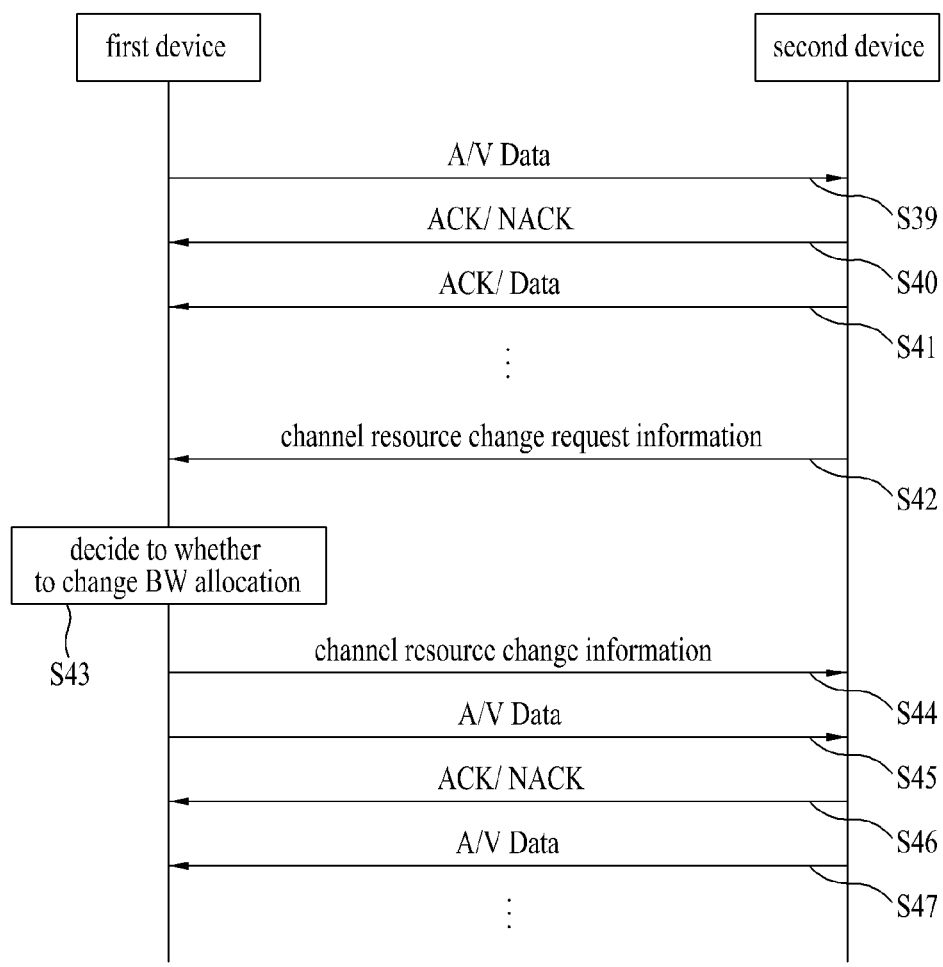
FIG. 15 is a flow chart illustrating an example of a procedure of changing a range of channel resources allocated between devices of a wireless network in accordance with another embodiment of the present invention.

FIG. 15 is a flow chart illustrating another example of a procedure of allocating channel resources in accordance with another embodiment of the present invention. Specifically, FIG. 15 illustrates an example of a method of allocating channel resources, in which a second device controls a range of channel resources allocated from a first device by requesting the first device to increase or decrease the channel resources.

Referring to FIG. 15, steps S39 to S41 of allocating a part of channel resources, which are allocated from the coordinator, from the first device to the second device in accordance with a channel resource allocation request of the second device are identical with the steps described with reference to FIG. 14.

As described above, in a state that a part of the channel resources is allocated, the second device requests the first device to increase or decrease the channel resources allocated to the first device (S42). The first device which has received a channel resource change request signal from the second device decides whether to accept the request of the second device (S43). If the first device decides to accept or reject the change request, it transmits channel resource change information to the second device to indicate such decided result (S44). If the first device accepts the channel resource change request in step S43, it increases or decreases the channel resources allocated to the second device and transmits the A/V data to the second device through the other part except for the channel resources allocated to the second device among all the channel resources allocated from the coordinator (S44). Then, the second device transmits the ACK/NACK signal of the data received from the first device (S45), and transmits the A/V data to the first device through the allocated channel resources (S46).

As described above, according to another embodiment of the present invention, the first device which has received the channel resource request signal and the channel resource change signal explicitly represents whether it has accepted the request of the second device by deciding whether to accept the channel resource request signal and the channel resource change signal and transmitting decision information of allocation of the channel resources to the second device which has transmitted the request signal and the change signal.

The channel resource allocation information can be included in a reserved field within a packet control field of a MAC control header data format, as described below with reference to Table 5 and FIG. 16. An example of a transmission format of the channel resource allocation information includes, but not limited to, the MAC control header data format.

Table 5 illustrates an example of a data format of a MAC control header.

TABLE 5

| Octets: 3 | 1 | 1 | 1 | 1 | 1 |
|---|---|---|---|---|---|
| Packet control | SrcID | DestID | WVANID | Stream index | Reserved |

In the wireless network, the MAC control header includes a SrcID field setting STID of the first device intended to A/V data, a DestID field setting STID of the second device which receives the A/V data, a WVNID field identifying a WVAN that includes the devices, a stream index field, and a reserved field. The channel resource allocation information transmitted from the first device to the second device in accordance with another embodiment of the present invention can be included in a packet control field of Table 5, specifically in the reserved field of FIG. 16.

FIG. 16 is a diagram illustrating an example of a data packet to which channel resource allocation information and channel resource change information are transmitted in accordance with another embodiment of the present invention.

Referring to FIG. 16, the packet control field includes a protocol version field 60 indicating correction of a protocol used for a packet included in the MAC control header, a packet class field 61 indicating a packet type, a MAC control filed 62 controlling MAC message in accordance with a data format of the packet class field, and a reserved field 65. In the case that the channel resource allocation information and/or the channel resource change information is transmitted in accordance with the embodiment of the present invention, a part of the reserved field can be defined as a time request confirm (TRC) field 63 that includes the channel resource allocation information. Also, the other part of the reserved field can be defined as a time change confirm (TCC) field that includes the channel resource change information.

Referring to FIG. 16, if 1 bit is respectively allocated to the TRC field and the TCC field, channel resource allocation information and channel resource change information can be transmitted using '0' or '1'. For example, if data corresponding to the TRC field and the TCC field is '0', it can represent that the first device rejects the request of the second device. If the data corresponding to the TRC field and the TCC field is '1', it can represent that the first device increases or decreases the allocation range of the channel resources by accepting the request of the second device.

The bits corresponding to the TRC field and the TCC field are not limited to FIG. 16. The first device can transmit more detailed channel allocation information to the second device by varying bits allocated to each field and or allocating more bits to each field. For another example, it is assumed that 2 bits are allocated to the TCC field. In this case, if the data of the TCC field is '00', it represents rejection of the channel resource change request. Also, if the data of the TCC field is '01', it represents that the first device will increase the channel resources in accordance with the increase request of the channel resources. Moreover, if the data of the TCC field is '10', it represents that the first device will decrease the channel resources in accordance with the decrease request of the channel resources. Finally, if the data of the TCC field is '11', it represents that the first device will reserve the request.

In other words, the first device can transfer channel resource allocation information or channel resource change information including channel resource information such as type or allocation range of channel resources to the second device by allocating more data bits to the TRF field and the TCC field.

Figure 17:
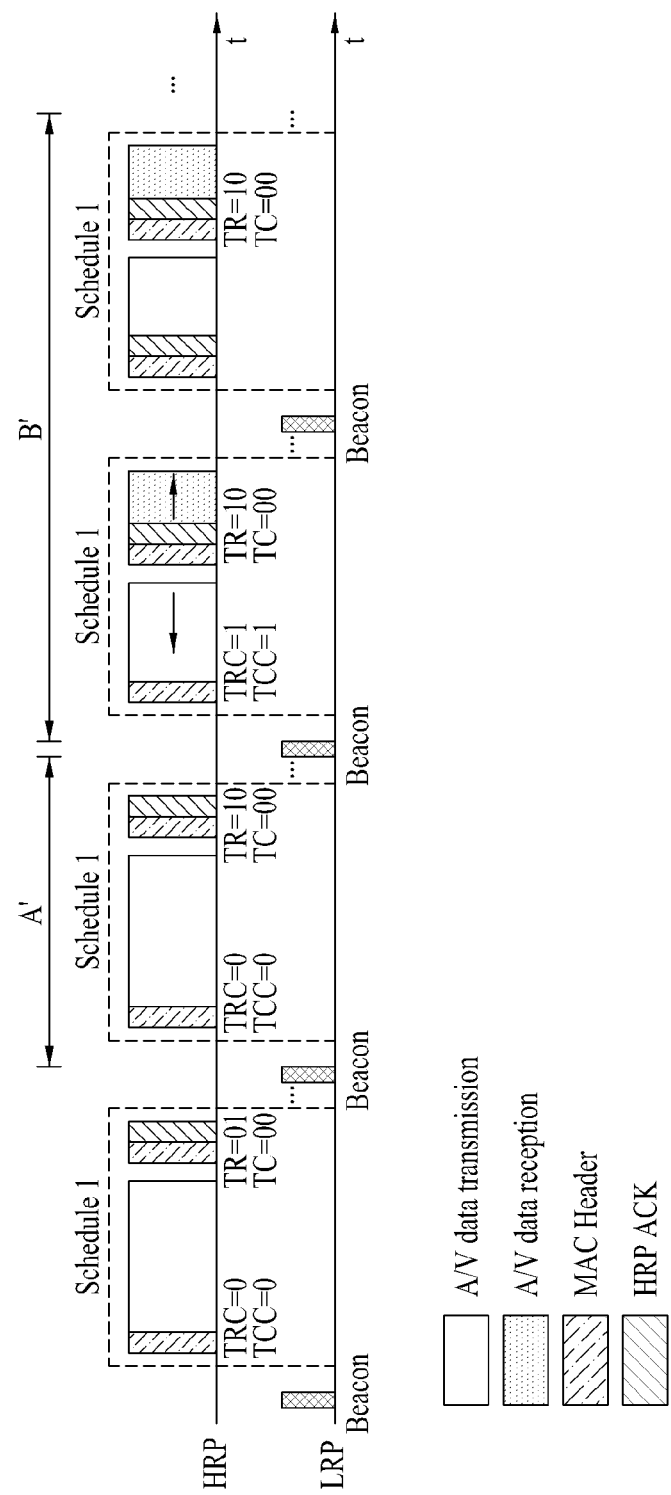
FIG. 17 is a diagram illustrating an example of data transmitted and received by channel resource allocation between devices of a wireless network in accordance with another embodiment of the present invention.
Figure 18:
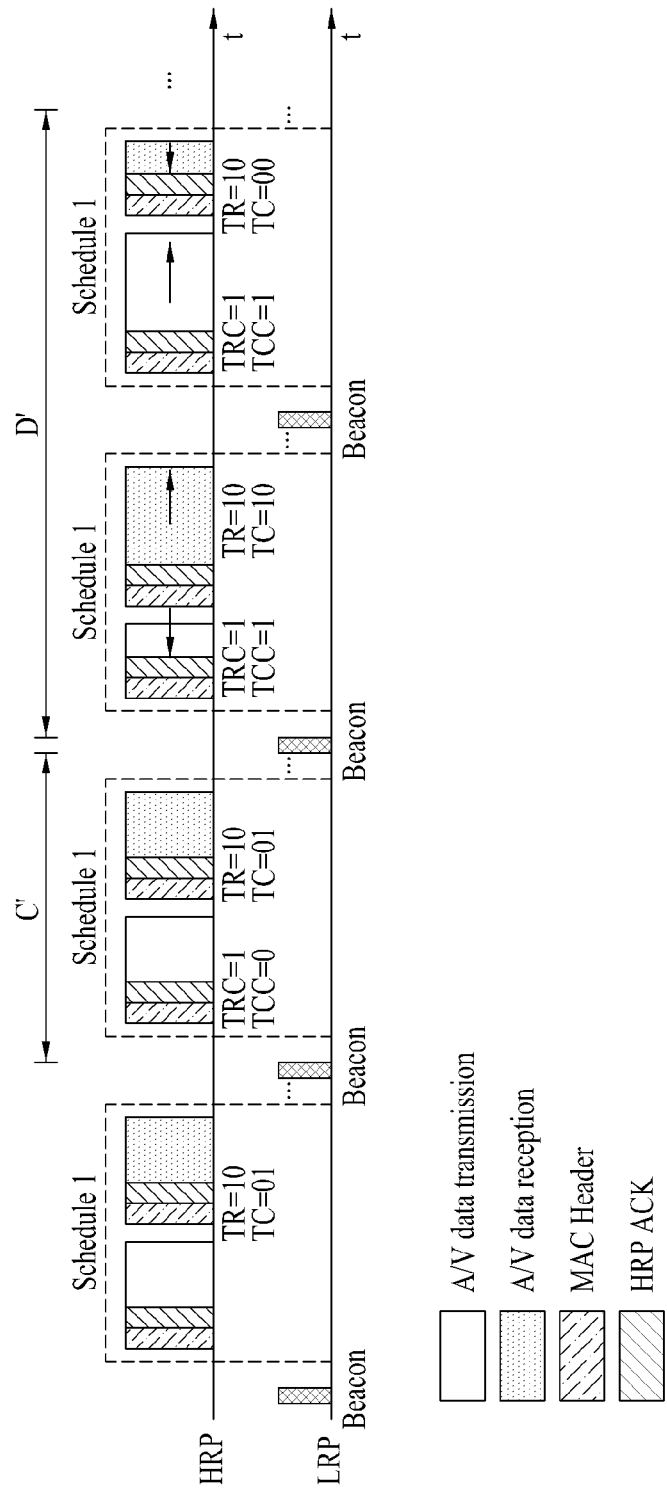
FIG. 18 is a diagram illustrating another example of data transmitted and received by channel resource allocation between devices of a wireless network in accordance with another embodiment of the present invention.

FIG. 17 and FIG. 18 are diagrams illustrating types of channel timing allocated between a first device and a second device in accordance with another embodiment of the present invention. Hereinafter, data transmission and reception according to channel resource allocation will be described based on an example where 1 bit is respectively allocated to the TRC field and the TCC field while 2 bits are respectively allocated to the TR field and the TC field.

Referring to FIG. 17, the first device transmits A/V data including MAC header to the second device. At this time, initial data of the TRC field and the TCC field included in the MAC header are set to '0'. The second device which has received the A/V data transmits ACK signal to the first device, wherein the ACK signal includes a MAC header part and a HRP ACK packet part. According to one embodiment of the present invention, the MAC header part includes a TRC field having channel resource allocation information and/or a TCC field having channel resource change information. The HRP ACK packet includes a TR field having the aforementioned channel resource request information and/or a TC field having channel resource change request information.

If the second device requests the first device to allocate a part of the channel resources, the first device can transmit data by setting data of the TR field of the HRP ACK packet to '01' and data of the TC field to '00'. If the first device intends to reject the channel resource request information in accordance with the priority order of transmission data, it transmits data to the second device by setting the data of the TRC field to '0' in the MAC header of the A/V data transmitted to the second device. At this time, since there are no channel resources allocated from the first device to the second device, the data of the TCC field is set to '0' (interval A').

On the other hand, if the first device accepts the channel time request (TR field data '10') of the second device, the data of the TRC field is set to '1'. Since the interval for channel resources is varied depending on channel resource allocation, the data of the TCC field is set to '1' (interval B'). Accordingly, the first device transmits A/V data to the second device using a part of a bandwidth allocated from the coordinator while the second device transmits A/V data to the first device through the allocated bandwidth. In a state that both devices share the channel resources, if the second device sets the data of the TC field to '00' and transmits ACK signal, the channel resources can be shared between the devices. Even in this case, the first device can request the second device to reallocate the channel resources through ACK/NACK signal of the A/V data received from the second device within the range of the channel resources allocated to the second device.

As described above, explicit transmission of response information to the second device through the MAC header in response to the channel resource request information of the second device corresponds to the step S38 of FIG. 14. The first device can transfer channel resource information to the second device more exactly by explicating indicating whether to allocate the channel resources.

Referring to FIG. 18, in a state that the first device and the second device share channel resources of a certain range, if the second device requests the first device to change the channel resources, such as increase or decrease the channel resources, the first device can transmit the MAC header including the channel resource change information to the second device.

If the second device transmits data to the first device by setting the data of the TR field of the HRP ACK packet to '10' and the data of the TC field to '01' and the first device intends to maintain the current shared status of the channel resources, it can reject the channel resource change information. In this case, the first device can transmit data to the second device by setting the data of the TRC field of the MAC header to '1' and the data of the TCC field to '0' (interval C'). On the other hand, if the first device accepts the channel resource change request of the second device, the data of the TRC field and the TCC field are set to '1' and then transmitted to the second device, wherein the data are included in the MAC header data (interval D').

As described above, explicit transmission of response information to the second device through the MAC header in response to the channel resource change request information of the second device corresponds to the step S44 of FIG. 15.

Figure 19:
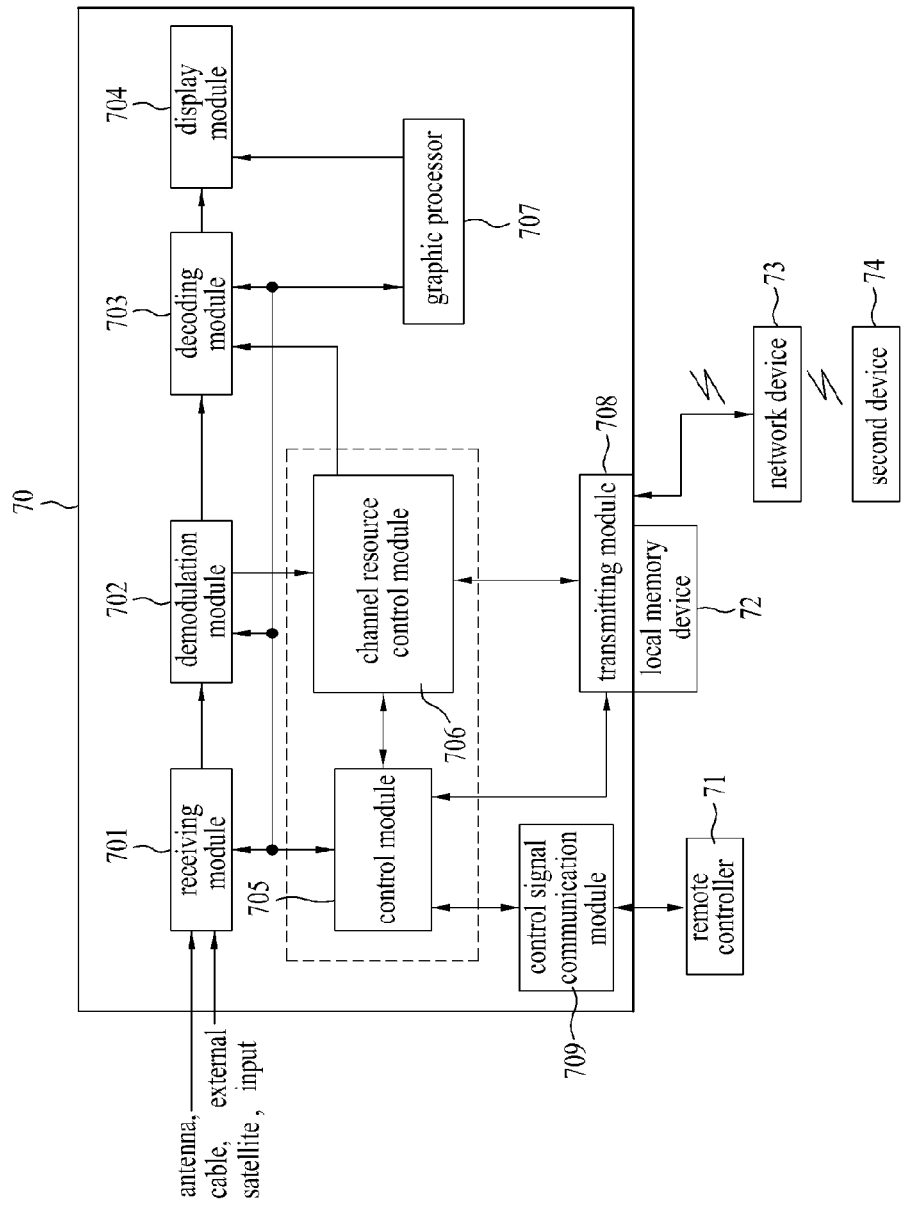
FIG. 19 is a diagram illustrating an example of a broadcasting signal processing system that includes a device of a wireless network according to one embodiment of the present invention.

FIG. 19 is a diagram illustrating an example of a broadcasting signal processing system that includes a device of a wireless network according to one embodiment of the present invention.

The device of the wireless network can play A/V data through processes which will be described layer, wherein the A/V data are input from a broadcasting station or a cable satellite through an antenna. Also, when the device acts as a source device or a transmitting device on the wireless network, it can remotely transmit the received A/V data to at least one sink device or receiving device. In the aforementioned embodiment of the present invention, a source device or transmitting device that transmits data corresponds to the first device while a sink device or receiving device that receives data corresponds to the second device.

Referring to FIG. 19, the broadcasting signal processing system that includes the first device according to one embodiment of the present invention includes a first device 70, a remote controller 71, a local memory device 72, and a network device 73 for performing wireless communication with a second device 74.

The first device 70 includes a receiving module 701, a demodulation module 702, a decoding module 703, a display module 704, a control module 705, a channel resource control module 706, a graphic processor 707, a transmitting module 708, and a control signal communication module 709. In the example of FIG. 19, the first device further includes a local memory device 72 directly connected with the transmitting module 708 that includes input and output ports. However, the local memory device may be a memory device mounted in the first device 70.

The transmitting module 708 can communicate with the wire/wireless network device 73, and can be connected with at least one second device 74 through the network device 73, wherein the at least one second device 74 exists on the wireless network. The control signal communication module 709 receives a user control signal in accordance with a user control device, for example, remote controller, and outputs the received signal to the control module.

The receiving module 701 could be a tuner that receives a broadcasting signal of a specific frequency through at least one of ground wave, satellite, cable, and Internet network. The receiving module 701 may be provided respectively for each of broadcasting sources, for example, ground wave broadcasting, cable broadcasting, satellite broadcasting, and personal broadcasting. Alternatively, the receiving module 701 may be a unified tuner. Also, supposing that the receiving module 701 is a tuner for ground wave broadcasting, at least one digital tuner and at least one analog tuner may be provided respectively, or a digital/analog tuner may be provided.

Furthermore, the receiving module 701 may receive internet protocol (IP) streams transferred through wire and wireless communication. If the receiving module 701 receives IP streams, the receiving module 701 can process transmitting and receiving packets in accordance with an IP protocol that establishes source and destination information for received IP packets and packets transmitted from the receiver. The receiving module 701 can output video/audio/data streams included in the received IP packets in accordance with the IP protocol, and can generate transport streams to be transmitted to the network as IP packets in accordance with the IP protocol to output them. The receiving module 701 is an element that receives an externally input video signal, and, for example, may receive IEEE 1394 type video/audio signals or HDMI type streams from the outside.

Also, according to the embodiment of the present invention, the receiving module may receive channel resource allocation request information or allocated channel resource change request information from the second device, or may receive AN data from the second device.

The demodulation module 702 demodulates broadcasting signals among data input through the receiving module 701 or broadcasting signals transmitted from the second device in an inverse order of a modulation mode. The demodulation module 702 outputs broadcasting streams by demodulating the broadcasting signals. If the receiving module 701 receives stream type signals, for example, IP streams, the IP streams are output to the decoding module 702 after bypassing the demodulation module 702.

The decoding module 703 includes an audio decoder and a video decoder, and decodes the broadcasting streams output from the demodulation module 702 through a decoding algorithm and outputs the decoded streams to the display module 704. At this time, a demultiplexer (not shown) that splits each stream in accordance with a corresponding identifier may additionally be provided between the demodulation module 702 and the decoding module 703. The demultiplxer splits the broadcasting signals into an audio element stream (ES) and a video element stream and outputs them to each decoder of the decoding module 703. Also, if a plurality of programs are multiplexed in one channel, the demultiplexer selects only a broadcasting signal of a program selected by a user and splits the selected broadcasting signal into a video element stream and an audio element stream. If data streams or system information streams are included in the demodulated broadcasting signals, they are split by the demultiplexer and then transferred to a corresponding decoding block (not shown).

The display module 704 displays broadcasting contents received from the receiving module 701 and contents stored in the local memory device 72. The display module 704 can display a menu indicating whether the memory device has been mounted in the first device and information related to the remaining capacity of the memory device, in accordance with a control command of the control module 215, and can be operated under the control of the user.

The control module 705 can control the operations of the aforementioned modules (receiving module, demodulation module, decoding module, display module, graphic processor, network control module, and interface module). Also, the control module 705 displays a menu that receives a control command of the user, and drives an application that displays various kinds of information or menu of the broadcasting signal processing system for the user.

For example, the control module 705 can read out the contents stored in the local memory device 72 if the local memory device 72 is mounted in the first device. Also, the control module 705 can control the operation of the local memory device 72 so that the broadcasting contents received from the receiving module 701 are stored in the local memory device 72 if the local memory device 72 is mounted in the first device. Furthermore, the control module 705 can output a control signal for mounting the local memory device 72 depending on whether the local memory device 72 has been mounted in the first device.

The control module 705 checks remaining memory capacity of the local memory device 72, and allows information of the remaining memory capacity to be displayed for the user on the display module 704 through the graphic processor 707. The control module 705 can shift the contents stored in the local memory device 72 to the remote memory device if the remaining memory capacity of the local memory device 72 is not sufficient. In this case, the control module 705 can display a menu indicating whether to shift the contents stored in the local memory device 72 to another local memory device (not shown) or the remote memory device through the display module 704. And, the control module 705 can receive and process a user control signal of the menu. Accordingly, the control module 705 can allow the contents stored in the local memory device 72 and other directly or remotely mounted memory device to be shifted between them and stored therein.

Furthermore, if request information of channel resource allocation is transferred from the receiving module 701, the control module 705 can transfer the request information to the channel resource control module 706 or directly control the channel resource allocation.

The channel resource control module 706 controls allocation of channel resources from the coordinator so that the first device 70 transmits data to the second device on the WHDI network. In order that the first device transmits data to the second device, the channel resources should be allocated from the coordinator to the first device. Accordingly, the channel resource control module 706 can control channel resources to transmit channel resource allocation request information requesting allocation of channel resources to the coordinator, or can control channel resources allocated from the coordinator.

Also, if allocation of the channel resources is requested from the second device 74 in accordance with the embodiment of the present invention, the channel resource control module 706 can decide whether to allocate the channel resources to the second device in accordance with the request or control whether to change the allocated channel resources. Namely, if the channel resource allocation request information transmitted from the second device is directly transferred from the receiving module 701 or transferred through the control module 705, the channel resource control module 706 can decide whether to allocate the channel resources and the allocation range in response to the channel resource allocation request. If the information of channel resource allocation decided by the channel resource control module is transferred to the control module 705, the control module 705 allocates the channel resources to the second device or changes the range of the allocated channel resources to control the resultant data.

The channel resource control module 706 may decide the available range and allocation range of the channel resources based on the decided result of the range of the channel resources and control channel resources for bidirectional communication with the second device 74 through the transmitting module 708 without going through the control module 705. Also, the channel resources may be controlled in such a manner that the channel resource control module 706 transmits the channel resource allocation request information or the channel resource change request information received from the second device 74 to the control module 705 and the control module 705 decides whether to accept or reject the request of the second device.

For convenience of description, although the control module 705 and the network control module 706 are provided separately in FIG. 19, these control modules can be implemented by one system chip as illustrated in a dotted line.

The graphic processor 707 processes a graphic to be displayed so that a menu screen is displayed in a video image displayed by the display module 704, and controls the graphic to be displayed in the display module 704 together with the menu screen.

The transmitting module 708 can transmit data to the at least one second device 74 through the wire and wireless network, and can include an interface module to perform bidirectional communication between the devices. If the channel resources are allocated from the coordinator, the first device transmits data to the second device through the transmitting module 708 within the range of the allocated channel resources.

The interface module can be interfaced with at least one second device 74 through the wire and wireless network. Examples of the interface module include Ethernet module, Bluetooth module, short distance wireless Internet module, portable Internet module, home PNA module, IEEE1394 module, PLC module, home RF module, and IrDA module. Meanwhile, the transmitting module 708 can output a control signal to the remote memory device, wherein the control signal can turn on the power. For example, although not shown in FIG. 19, the transmitting module 708 can turn on the power of a separate remote memory device by transmitting a WOL signal to a network interface module that performs communication with a separate remote memory device.

The terms herein can be replaced with other terms. For example, "device" can be replaced with user device (or machine), station, etc., and "coordinator" can be replaced with coordinating (control) device, coordinating (or control) station, piconet coordinator, etc. Also, the device that transmits channel resources of a certain range allocated from the coordinator to other device can be replaced with "originator," or "transmitting device" in view of the relation with the device that receives the data. The device that receives data can be replaced with "target device," or "receiving device" in view of the relation with the device that transmits the data.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of allocating allocated channel resources from a first device to a second device in a wireless network, the method comprising:

receiving channel resource allocation information by the first device from a coordinator of the wireless network, the channel resource allocation information used for allocating the channel resources to the first device;

transmitting data from the first device to the second device through the channel resources allocated from the coordinator;

receiving channel resource request information by the first device from the second device, the channel resource request information used for requesting the first device to share a part of the allocated channel resources with the second device; and determining, by the first device, whether to share the part of the allocated channel resources with the second device in accordance with the channel resource request information.

2. The method of claim 1, wherein the allocated channel resources are channel time blocks (CTB).

3. The method of claim 1, wherein the channel resource request information included in the HRP (High-Rate Physical layer) ACK header.

4. The method of claim 1, if the first device determines to reject the channel resource allocation request, further comprising transmitting data from the first device to the second device through the entire part of the allocated channel resources allocated from the coordinator.

5. The method of claim 4, further comprising transmitting channel resource allocation information from the first device to the second device to reject the channel resource allocation request.

6. The method of claim 5, wherein the channel resource allocation information included in the MAC (Medium Access Control) header.

7. The method of claim 1, if the first device determines to accept the channel resource allocation request, further comprising:

transmitting data from the first device to the second device through a part of the allocated channel resources ; and receiving data, by the first device, from the second device through the other part except for the part of the allocated channel resources.

8. The method of claim 7, further comprising transmitting channel resource allocation information from the first device to the second device to accept the channel resource allocation request.

9. The method of claim 8, wherein the channel resource allocation information included in the MAC header.

10. A device which is a first device allocated with allocated channel resources from a coordinator in a wireless network, the device comprising:

a transmitting module transmitting data to a second device through the allocated channel resources allocated from the coordinator;

a receiving module receiving channel resource allocation request information from the second device, the channel resource request information used for requesting the first device to share a part of the allocated channel resources with the second device; and a channel resource control module determining whether to share the part of the allocated channel resources with the second device, in accordance with the channel resource allocation request information.

11. The device of claim 10, wherein the channel resource control module, if the channel resource control module determines to accept the channel resource allocation request, transmits data to the second device through a part of the allocated channel resources, and receives data from the second device through the other part except for the part of the allocated channel resources.

12. The device of claim 11, wherein the channel resource control module transmits channel resource allocation information to accept the channel resource allocation request to the second device through the transmitting module.

* * * * *